US009171505B2

(12) United States Patent
Lee et al.

(10) Patent No.: US 9,171,505 B2
(45) Date of Patent: Oct. 27, 2015

(54) SCAN DRIVING UNIT AND ORGANIC LIGHT EMITTING DISPLAY DEVICE HAVING THE SAME

(71) Applicant: Samsung Display Co., Ltd., Yongin, Gyeonggi-Do (KR)

(72) Inventors: Hae-Yeon Lee, Yongin (KR); Jeong-Keun Ahn, Yongin (KR)

(73) Assignee: Samsung Display Co., Ltd., Gyeonggi-Do (KR)

( * ) Notice: Subject to any disclaimer, the term of this patent is extended or adjusted under 35 U.S.C. 154(b) by 62 days.

(21) Appl. No.: 13/901,510

(22) Filed: May 23, 2013

(65) Prior Publication Data

US 2014/0002424 A1 Jan. 2, 2014

(30) Foreign Application Priority Data

Jun. 28, 2012 (KR) ........................ 10-2012-0069633

(51) Int. Cl.

| | |
|---|---|
| ***G06F 3/038*** | (2013.01) |
| ***G09G 5/00*** | (2006.01) |
| ***G09G 3/32*** | (2006.01) |

(52) U.S. Cl.

CPC .................................... *G09G 3/3266* (2013.01)

(58) Field of Classification Search

CPC .............. G09G 3/3208; G09G 3/3266; G09G 2310/0213

See application file for complete search history.

(56) References Cited

U.S. PATENT DOCUMENTS

| | | | | |
|---|---|---|---|---|
| 4,816,816 A * | 3/1989 | Usui | | 345/103 |
| 6,023,256 A * | 2/2000 | Ng et al. | | 345/211 |
| 8,325,112 B2 | 12/2012 | Park et al. | | |
| 2005/0184933 A1* | 8/2005 | Tomohara | | 345/76 |
| 2006/0022968 A1* | 2/2006 | Kondo et al. | | 345/211 |
| 2011/0296262 A1* | 12/2011 | Kim et al. | | 714/726 |

FOREIGN PATENT DOCUMENTS

| | | |
|---|---|---|
| KR | 10-2007-0113917 A | 11/2007 |
| KR | 10-2009-0046403 A | 5/2009 |
| KR | 10-2011-0129219 A | 12/2011 |

* cited by examiner

*Primary Examiner* — Kumar Patel
*Assistant Examiner* — Insa Sadio
(74) *Attorney, Agent, or Firm* — Knobbe Martens Olson & Bear LLP

(57) ABSTRACT

A scan driving unit and OLED display device including the unit are disclosed. In one aspect, the unit includes a first pre-decoder block that receives upper scan-line selection signals for selecting one of upper scan-lines that are arranged in an upper display region of a display panel, and outputs first logic signals based on the upper scan-line selection signals. It also includes a second pre-decoder block that receives lower scan-line selection signals for selecting one of lower scan-lines that are arranged in a lower display region of the display panel, and outputs second logic signals based on the lower scan-line selection signals. It further includes a first final-decoder block coupled between the upper display region and the first pre-decoder block that selects one of the upper scan-lines based on the first logic signals, and a second final-decoder block coupled between the lower display region and the second pre-decoder block that selects one of the lower scan-lines based on the second logic signals.

26 Claims, 13 Drawing Sheets

SCAN DRIVING UNIT AND ORGANIC LIGHT EMITTING DISPLAY DEVICE HAVING THE SAME

CROSS-REFERENCE TO RELATED APPLICATIONS

This application claims priority under 35 USC §119 to Korean Patent Applications No. 10-2012-0069633, filed on Jun. 28, 2012 in the Korean Intellectual Property Office (KIPO), the contents of which are incorporated herein in its entirety by reference.

BACKGROUND

1. Technological Field

The inventive technology generally relates to a display device employing organic light emitting diodes (OLEDs). More particularly, the inventive concept relates to a scan driving unit, and an OLED display device having the scan driving unit.

2. Description of the Related Technology

Recently, OLED technology has been widely used in flat panel display devices. Generally, an OLED display device implements (i.e., displays) a specific gray level using a voltage stored in a storage capacitor of each pixel circuit (i.e., an analog driving technique). However, the analog driving technique may not accurately implement a desired gray level because the technique uses the voltage (i.e., an analog value) stored in the storage capacitor of each pixel circuit.

To overcome these problems, a digital driving technique has been suggested for such devices. Specifically, each frame is produced by displaying a plurality of sub-frames. That is, one frame is divided into a plurality of sub-frames, where the emission time of each sub-frame is varied (e.g., by a factor of 2), and implements a specific gray level based on the sum of emission times of the sub-frames.

Since the technique displays one frame by display of a plurality of sub-frames (i.e., a scan time is relatively short), a scan driving unit of such device needs to operate at a high speed. Furthermore, these devices may employ a random scan digital driving technique. In this case, a scan driving unit is often implemented by a decoder-type internal circuit to randomly perform scan operations, where the decoder-type internal circuit includes a pre-decoder block and a final-decoder block.

Here, since logic signals output from the pre-decoder block that is located outside a display panel is input to the final-decoder block that is located inside the display panel, a plurality of signal-lines for transferring the logic signals from the pre-decoder block to the final-decoder block are arranged in an outer region of the display panel. Thus, as the resolution of the display panel increases, the number of the signal-lines that are arranged in the outer region of the display panel is greater. This can result in a large "dead space" of the display panel that increases its overall size.

SUMMARY OF CERTAIN INVENTIVE ASPECTS

Certain aspects of the invention relate to a scan driving unit capable of reducing the number of signal-lines by which a pre-decoder block that is located outside a display panel is coupled to a final-decoder block that is located inside the display panel (hereinafter, referred to as outer signal-lines of the display panel).

Applications of the technology include an organic light emitting display device having the scan driving unit.

According to one aspect, a scan driving unit may include a first pre-decoder block configured to receive upper scan-line selection signals for selecting one of upper scan-lines that are arranged in an upper display region of a display panel of an organic light emitting display device, and configured to output first logic signals based on the upper scan-line selection signals, a second pre-decoder block configured to receive lower scan-line selection signals for selecting one of lower scan-lines that are arranged in a lower display region of the display panel, and configured to output second logic signals based on the lower scan-line selection signals, a first final-decoder block coupled between the upper display region and the first pre-decoder block, and configured to select one of the upper scan-lines based on the first logic signals, and a second final-decoder block coupled between the lower display region and the second pre-decoder block, and configured to select one of the lower scan-lines based on the second logic signals.

In example embodiments, the first and second pre-decoder blocks may be located outside the display panel, and the first and second final-decoder blocks may be located inside the display panel.

In example embodiments, the first and second pre-decoder blocks may be included in a timing control unit of the organic light emitting display device, and the first and second final-decoder blocks may be included in the display panel.

In example embodiments, the first pre-decoder block may include a plurality of first decoders configured to generate the first logic signals based on the upper scan-line selection signals.

In example embodiments, the second pre-decoder block may include a plurality of second decoders configured to generate the second logic signals based on the lower scan-line selection signals.

In example embodiments, the number of signal-lines that are arranged in an outer region of the upper display region may correspond to a sum of the number of output-lines of the first decoders.

In example embodiments, the number of signal-lines that are arranged in an outer region of the lower display region may correspond to a sum of the number of output-lines of the second decoders.

In example embodiments, a multiplication of the number of the output-lines of the first decoders may correspond to the number of the upper scan-lines of the display panel.

In example embodiments, a multiplication of the number of the output-lines of the second decoders may correspond to the number of the lower scan-lines of the display panel.

In example embodiments, the sum of the number of the output-lines of the first decoders may be the same as the sum of the number of the output-lines of the second decoders.

In example embodiments, the sum of the number of the output-lines of the first decoders may be different from the sum of the number of the output-lines of the second decoders.

According to another aspect, a scan driving unit may include a first pre-decoder block configured to receive upper scan-line selection signals for selecting one of upper scan-lines that are arranged in an upper display region of a display panel of an organic light emitting display device, and configured to output first logic signals and first inverted logic signals based on the upper scan-line selection signals, the first inverted logic signals being generated by inverting the first logic signals, a second pre-decoder block configured to receive lower scan-line selection signals for selecting one of lower scan-lines that are arranged in a lower display region of the display panel, and configured to output second logic signals and second inverted logic signals based on the lower scan-line selection signals, the second inverted logic signals being generated by inverting the second logic signals, a first final-decoder block coupled between the upper display region and the first pre-decoder block, and configured to select one of the upper scan-lines based on the first logic signals and the first inverted logic signals, and a second final-decoder block coupled between the lower display region and the second pre-decoder block, and configured to select one of the lower scan-lines based on the second logic signals and the second inverted logic signals.

In example embodiments, the first and second pre-decoder blocks may be located outside the display panel, and the first and second final-decoder blocks may be located inside the display panel.

In example embodiments, the first and second pre-decoder blocks may be included in a timing control unit of the organic light emitting display device, and the first and second final-decoder blocks may be included in the display panel.

In example embodiments, the first pre-decoder block may include a plurality of first decoders configured to generate the first logic signals based on the upper scan-line selection signals, and a plurality of first inverters configured to generate the first inverted logic signals based on the first logic signals.

In example embodiments, the second pre-decoder block may include a plurality of second decoders configured to generate the second logic signals based on the lower scan-line selection signals, and a plurality of second inverters configured to generate the second inverted logic signals based on the second logic signals.

In example embodiments, the number of signal-lines that are arranged in an outer region of the upper display region may correspond to a sum of the number of output-lines of the first decoders.

In example embodiments, the number of signal-lines that are arranged in an outer region of the lower display region may correspond to a sum of the number of output-lines of the second decoders.

In example embodiments, a multiplication of the number of the output-lines of the first decoders may correspond to the number of the upper scan-lines of the display panel.

In example embodiments, a multiplication of the number of the output-lines of the second decoders may correspond to the number of the lower scan-lines of the display panel.

In example embodiments, the sum of the number of the output-lines of the first decoders may be the same as the sum of the number of the output-lines of the second decoders.

In example embodiments, the sum of the number of the output-lines of the first decoders may be different from the sum of the number of the output-lines of the second decoders.

According to another aspect, an organic light emitting display device may include a display panel having a plurality of pixel circuits, a scan driving unit configured to provide a scan signal to the pixel circuits, a data driving unit configured to provide a data signal to the pixel circuits, a power unit configured to provide a high power voltage and a low power voltage to the pixel circuits, and a timing control unit configured to control the scan driving unit, the data driving unit, and the power unit. Here, the scan driving unit may include a two-stage upper decoding structure and a two-stage lower decoding structure that are coupled to an upper display region of the display panel and a lower display region of the display panel, respectively.

In example embodiments, the organic light emitting display device may employ a digital driving technique that divides one frame into a plurality of sub-frames, differently sets each emission time of the sub-frames, and implements a specific gray level based on a sum of emission times of the sub-frames.

In example embodiments, the two-stage upper decoding structure may include a first pre-decoder block configured to receive upper scan-line selection signals for selecting one of upper scan-lines that are arranged in the upper display region, and configured to output first logic signals based on the upper scan-line selection signals, and a first final-decoder block coupled between the upper display region and the first pre-decoder block, and configured to select one of the upper scan-lines based on the first logic signals.

In example embodiments, the two-stage lower decoding structure may include a second pre-decoder block configured to receive lower scan-line selection signals for selecting one of lower scan-lines that are arranged in the lower display region, and configured to output second logic signals based on the lower scan-line selection signals, and a second final-decoder block coupled between the lower display region and the second pre-decoder block, and configured to select one of the lower scan-lines based on the second logic signals.

In example embodiments, the two-stage upper decoding structure may include a first pre-decoder block configured to receive upper scan-line selection signals for selecting one of upper scan-lines that are arranged in the upper display region, and configured to output first logic signals and first inverted logic signals based on the upper scan-line selection signals, the first inverted logic signals being generated by inverting the first logic signals, and a first final-decoder block coupled between the upper display region and the first pre-decoder block, and configured to select one of the upper scan-lines based on the first logic signals and the first inverted logic signals.

In example embodiments, the two-stage lower decoding structure may include a second pre-decoder block configured to receive lower scan-line selection signals for selecting one of lower scan-lines that are arranged in the lower display region, and configured to output second logic signals and second inverted logic signals based on the lower scan-line selection signals, the second inverted logic signals being generated by inverting the second logic signals, and a second final-decoder block coupled between the lower display region and the second pre-decoder block, and configured to select one of the lower scan-lines based on the second logic signals and the second inverted logic signals.

Therefore, a scan driving unit according to some example embodiments may reduce the number of outer signal-lines of a display panel by including a two-stage upper decoding structure and a two-stage lower decoding structure that are coupled to an upper display region of the display panel and a lower display region of the display panel, respectively. In detail, the scan driving unit may have a structure in which the upper display region of the display panel and the lower display region of the display panel are coupled to a first final-decoder block and a second final-decoder block, respectively, and the first final-decoder block and the second final-decoder block are coupled to a first pre-decoder block and a second pre-decoder block, respectively.

In addition, an organic light emitting display device having the scan driving unit according to some example embodiments may minimize (i.e., reduce) a dead space of a display panel by reducing the number of outer signal-lines of the display panel.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF CERTAIN INVENTIVE EMBODIMENTS

Figure 1:
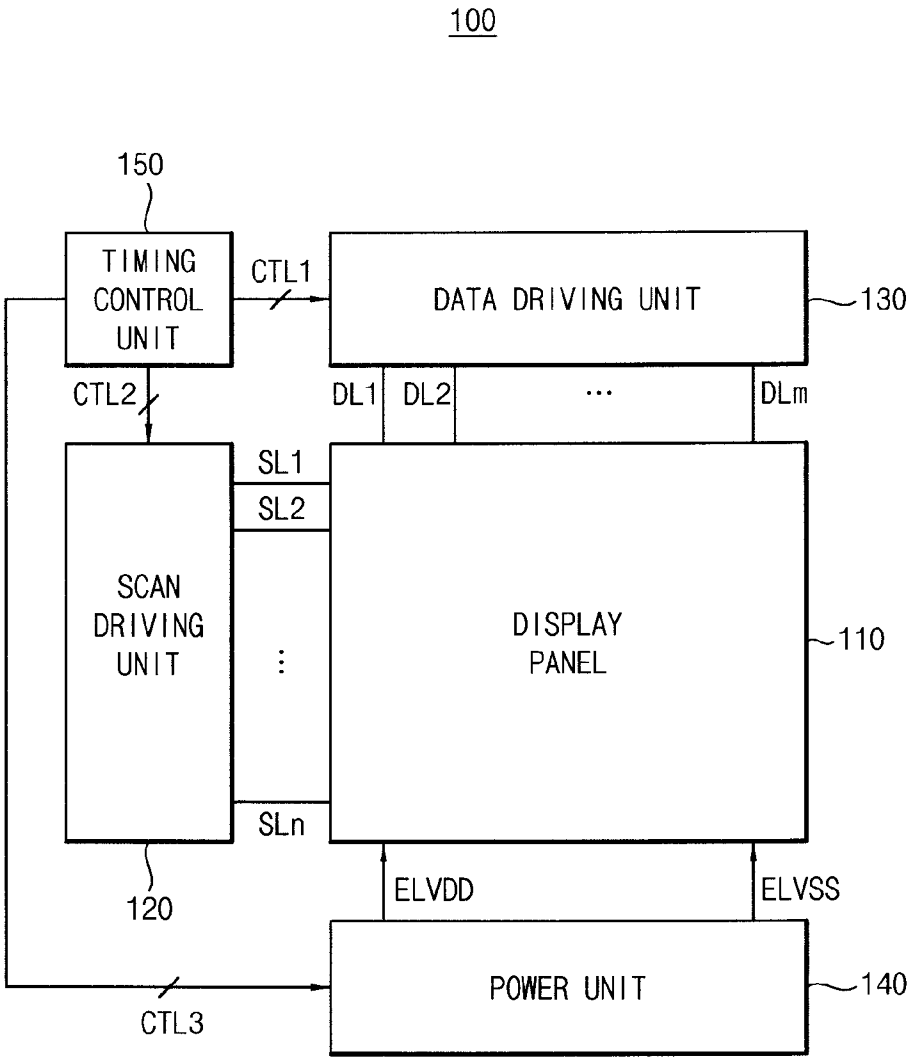
FIG. 1 is a block diagram illustrating an organic light emitting display device according to example embodiments.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
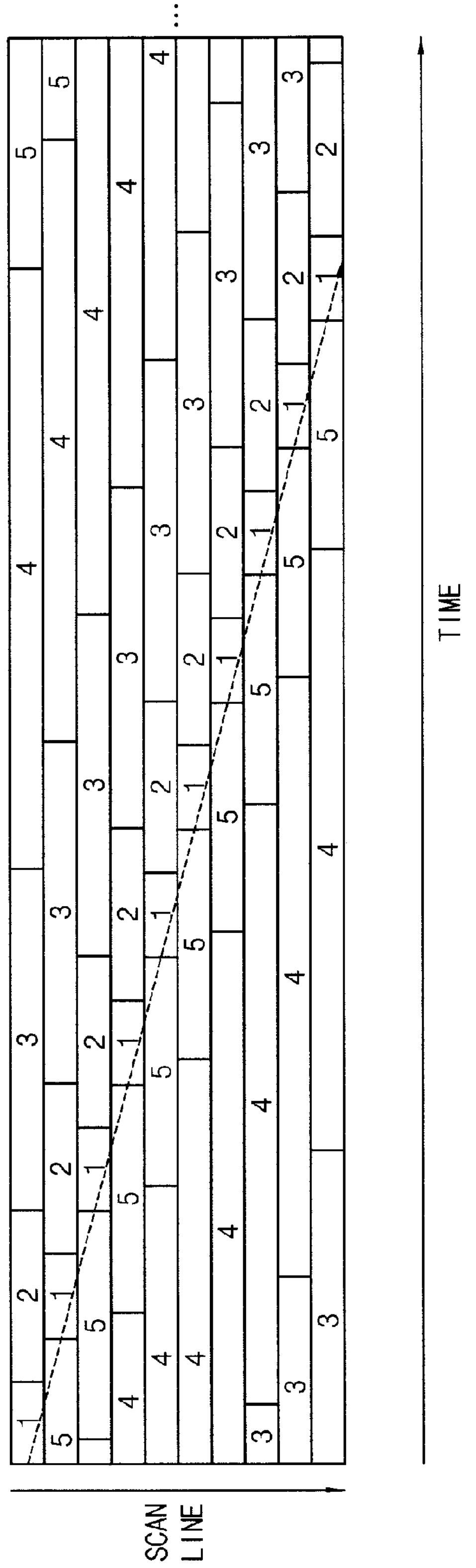
FIG. 2 is a diagram illustrating an example in which an organic light emitting display device of FIG. 1 operates based on a digital driving technique.

FIG. 1 is a block diagram illustrating an organic light emitting display device according to example embodiments. FIG. 2 is a diagram illustrating an example in which an organic light emitting display device of FIG. 1 operates based on a digital driving technique.

Referring to FIGS. 1 and 2, the OLED display device 100 includes a display panel 110, a scan driving unit 120, a data driving unit 130, a power unit 140, and a timing control unit 150. Throughout this description, the OLED display will sometimes be referred to as an organic light emitting display.

The display panel 110 includes a plurality of pixel circuits. The scan driving unit 120 provides a scan signal to the pixel circuits via a plurality of scan-lines SL1 through SLn. The data driving unit 130 provides a data signal to the pixel circuits via a plurality of data-lines DL1 through DLm. The power unit 140 generates a high power voltage ELVDD and a low power voltage ELVSS, and provides the high power voltage ELVDD and the low power voltage ELVSS to the pixel circuits via a plurality of power-lines. The timing control unit 140 generates a plurality of control signals CTL1 through CTL3, and provides the control signals CTL1 through CTL3 to the data driving unit 130, the scan driving unit 120, and the power unit 140 to control the data driving unit 130, the scan driving unit 120, and the power unit 140, respectively. Although it is illustrated in FIG. 1 that the scan driving unit 120, the data driving unit 130, the power unit 140, and the timing control unit 150 are separately implemented, the scan driving unit 120, the data driving unit 130, the power unit 140, and the timing control unit 150 may be combined. Thus, the scan driving unit 120, the data driving unit 130, the power unit, and the timing control unit 150 may be interpreted as functions of at least one peripheral circuit coupled to the display panel 110. For example, the timing control unit 150 may perform operations of the scan driving unit 120, the data driving unit 130, the power unit 140, or may include at least one component for performing operations of the scan driving unit 120, the data driving unit 130, the power unit 140.

In various disclosed embodiments, the display device 100 employs a digital driving technique that divides one frame into a plurality of sub-frames, and differently schedules each emission time of the sub-frames (e.g., by a factor of 2), and implements a specific gray level based on the sum of emission times of the sub-frames. Specifically, each emission time of the sub-frames corresponds to each bit of a data signal. That is, assuming that one frame is divided into first through fourth sub-frames, each emission time of the first through fourth sub-frames may differ (i.e., may increase) by a factor of 2. For example, an emission time of the second sub-frame may be twice of an emission time of the first sub-frame, an emission time of the third sub-frame may be twice of an emission time of the second sub-frame, and an emission time of the fourth sub-frame may be twice of an emission time of the third sub-frame. Here, a sub-frame having the longest emission time (e.g., the fourth sub-frame) may correspond to the most significant bit (MSB) of the data signal, and a sub-frame having the shortest emission time (e.g., the first sub-frame) may correspond to the least significant bit (LSB) of the data signal. As a result, a specific gray level is implemented based on a sum of the emission times of the first through fourth sub-frames. However, since the digital driving technique displays one frame by displaying a plurality of sub-frames (i.e., a scan time is relatively short), the scan driving unit 120 of the organic light emitting display device 100 needs to operate at a high speed.

Furthermore, the organic light emitting display device 100 may employ a random scan digital driving technique. In this case, the scan driving unit 120 may be implemented by a decoder-type internal circuit to randomly perform scan operations, where the decoder-type internal circuit includes a pre-decoder block and a final-decoder block. That is, unlike a progressive scan digital driving technique, as illustrated in FIG. 2, the random scan digital driving technique randomly performs scan operations of sub-frames 1, 2, 3, 4, and 5 for all scan-lines by shifting sub-frame scan timings of all scan-lines by a specific time. Thus, the random scan digital driving technique may randomly (i.e., separately) perform emission operations of the sub-frames 1, 2, 3, 4, and 5 for all scan-lines. The scan driving unit 120 may randomly perform scan operations based on a two-stage upper decoding structure and a two-stage lower decoding structure that are coupled to an upper display region of the display panel 110 and a lower display region of the display panel 110, respectively. Although it is described above that the digital driving technique and the random scan digital driving technique are related to the organic light emitting display device 100, the present inventive concept is not limited to the digital driving technique and the random scan digital driving technique.

The scan driving unit 120 may have a structure in which the upper display region of the display panel 110 and the lower display region of the display panel 110 are coupled to the two-stage upper decoding structure and the two-stage lower decoding structure, respectively. In one example embodiment, the two-stage upper decoding structure of the scan driving unit 120 includes a first pre-decoder block and a first final-decoder block. The first pre-decoder block receives upper scan-line selection signals for selecting one of upper scan-lines that are arranged in the upper display region of the display panel 110, and outputs first logic signals and first inverted logic signals based on the upper scan-line selection signals, where the first inverted logic signals are generated by inverting the first logic signals. The first final-decoder block is coupled between the upper display region of the display panel 110 and the first pre-decoder block, and selects one of the upper scan-lines based on the first logic signals and the first inverted logic signals. In addition, the two-stage lower decoding structure of the scan driving unit 120 may include a second pre-decoder block and a second final-decoder block. The second pre-decoder block may receive lower scan-line selection signals for selecting one of lower scan-lines that are arranged in the lower display region of the display panel 110, and may output second logic signals and second inverted logic signals based on the lower scan-line selection signals, where the second inverted logic signals are generated by inverting the second logic signals. The second final-decoder block may be coupled between the lower display region of the display panel 110 and the second pre-decoder block, and may select one of the lower scan-lines based on the second logic signals and the second inverted logic signals. The two-stage upper decoding structure and the two-stage lower decoding structure will be described in detail with reference to FIGS. 3 through 5.

In another example embodiment, the two-stage upper decoding structure of the scan driving unit 120 may include a first pre-decoder block and a first final-decoder block. The first pre-decoder block may receive upper scan-line selection signals for selecting one of upper scan-lines that are arranged in the upper display region of the display panel 110, and may output first logic signals based on the upper scan-line selection signals. The first final-decoder block may be coupled between the upper display region of the display panel 110 and the first pre-decoder block, and may select one of the upper scan-lines based on the first logic signals. In addition, the two-stage lower decoding structure of the scan driving unit 120 may include a second pre-decoder block and a second final-decoder block. The second pre-decoder block may receive lower scan-line selection signals for selecting one of lower scan-lines that are arranged in the lower display region of the display panel 110, and may output second logic signals based on the lower scan-line selection signals. The second final-decoder block may be coupled between the lower display region of the display panel 110 and the second pre-decoder block, and may select one of the lower scan-lines based on the second logic signals. The two-stage upper decoding structure and the two-stage lower decoding structure will be described in detail with reference to FIGS. 6 through 8. Hereinafter, the scan driving unit 120 included in the organic light emitting display device 100 will be described in detail.

Figure 3:
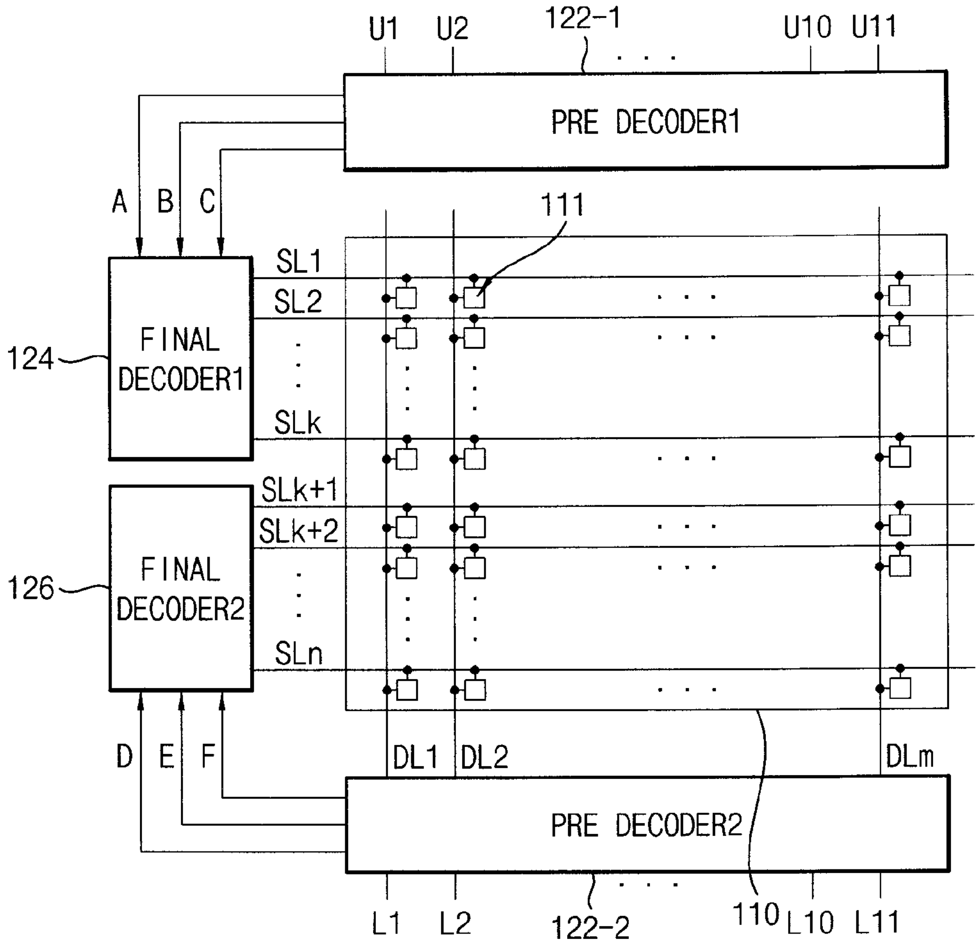
FIG. 3 is a block diagram illustrating an example of a scan driving unit included in an organic light emitting display device of FIG. 1.

FIG. 3 is a block diagram illustrating an example of a scan driving unit included in an organic light emitting display device of FIG. 1.

Referring to FIG. 3, the scan driving unit 120 includes a first pre-decoder block 122-1, a second pre-decoder block 122-2, a first final-decoder block 124, and a second final-decoder block 126. The display panel 110 includes a plurality of pixel circuits 111 that are arranged at locations corresponding to crossing points of the scan-lines SL1 through SLn and the data-lines DL1 through DLm. As described above, the first pre-decoder block 122-1 and the first final-decoder block 124 correspond to the two-stage upper decoding structure of the scan driving unit 120, and the second pre-decoder block 122-2 and the second final-decoder block 126 correspond to the two-stage lower decoding structure of the scan driving unit 120.

The first pre-decoder block 122-1 receives the upper scan-line selection signals U1 through U11 for selecting one of the upper scan-lines SL1 through SLk that are arranged in the upper display region of the display panel 110, and may output the first logic signals A, B, and C based on the upper scan-line selection signals U1 through U11. The second pre-decoder block 122-2 may receive the lower scan-line selection signals L1 through L11 for selecting one of the lower scan-lines SLk+1 through SLn that are arranged in the lower display region of the display panel 110, and may output the second logic signals D, E, and F based on the lower scan-line selection signals L1 through L11. Although it is illustrated in FIG. 3 that the first and second pre-decoder blocks 122-1 and 122-2 and the first and second final-decoder blocks 124 and 126 are located outside the display panel 110, it should be understood that the first and second pre-decoder blocks 122-1 and 122-2 are located outside the display panel 110, and the first and second final-decoder blocks 124 and 126 are located inside the display panel 110. According to some example embodiments, the first and second pre-decoder blocks 122-1 and 122-2 may be included in the timing control unit 150 of the organic light emitting display device 100. In addition, the first and second final-decoder blocks 124 and 126 may be included in the display panel 110 of the organic light emitting display device 100.

The first final-decoder block 124 may be coupled between the upper display region of the display panel 110 and the first pre-decoder block 122-1, and may select one of the upper scan-lines SL1 through SLk that are arranged in the upper display region of the display panel 110 based on the first logic signals A, B, and C. The second final-decoder block 126 may be coupled between the lower display region of the display panel 110 and the second pre-decoder block 122-2, and may select one of the lower scan-lines SLk+1 through SLn that are arranged in the lower display region of the display panel 110 based on the second logic signals D, E, and F. As illustrated in FIG. 3, the first pre-decoder block 122-1 may be coupled to the first final-decoder block 124 to select one of the upper scan-lines SL1 through SLk that are arranged in the upper display region of the display panel 110, the second pre-decoder block 122-2 may be coupled to the second final-decoder block 126 to select one of the lower scan-lines SLk+1 through SLn that are arranged in the lower display region of the display panel 110, and the first final-decoder block 124 may be separated from the second final-decoder block 126 in the display panel 110. Although the first final-decoder block 124 is separated from the second final-decoder block 126, it should be understood that the upper display region and the lower display region of the display panel 110 are not driven independently of each other. Therefore, when a value of a line counter that counts the scan-lines SL1 through SLn indicates the upper display region of the display panel 110, the value of the line counter may be matched to the upper scan-line selection signals U1 through U11. On the other hand, when the value of the line counter indicates the lower display region of the display panel 110, a value generated by subtracting the number of the upper scan-lines SL1 through SLk from the value of the line counter may be matched to the lower scan-line selection signals L1 through L11.

For example, when an FHD resolution is implemented, the number of total scan-lines SL1 through SLn of the display panel 110 may be 1080. For convenience of descriptions, it is assumed that the number of the upper scan-lines SL1 through SLk is 540, and the number of the lower scan-lines SLk+1 through SLn is also 540. In this case, if the value of the line counter is between 0 and 539, the upper display region of the display panel 110 may be selected, and the value of the line counter may be matched to the upper scan-line selection signals U1 through U11. On the other hand, if the value of the line counter is between 540 and 1079, the lower display region of the display panel 110 may be selected, and the value generated by subtracting 540 (i.e., the number of the upper scan-lines SL1 through SLk) from the value of the line counter may be matched to the lower scan-line selection signals L1 through L11. Although it is illustrated in FIG. 3 that the first pre-decoder block 122-1 receives eleven upper scan-line selection signals U1 through U11, the second pre-decoder block 122-2 receives eleven lower scan-line selection signals L1 through L11, the first final-decoder block 124 receives three first logic signals A, B, and C, and the second final-decoder block 126 receives three second logic signals D, E, and F, the number of signals is not limited thereto. That is, the number of signals may be variously changed according to required conditions. As described above, the scan driving unit 120 may have the two-stage upper decoding structure and the two-stage lower decoding structure (i.e., the upper display region of the display panel 110 and the lower display region of the display panel 110 are coupled to the first final-decoder block 124 and the second final-decoder block 126, respectively, and the first final-decoder block 124 and the second final-decoder block 126 are coupled to the first pre-decoder block 122-1 and the second pre-decoder block 122-2, respectively.). Thus, the scan driving unit 120 may reduce a dead space of the display panel 110 by reducing the number of outer signal-lines of the display panel 110.

Figure 4A:
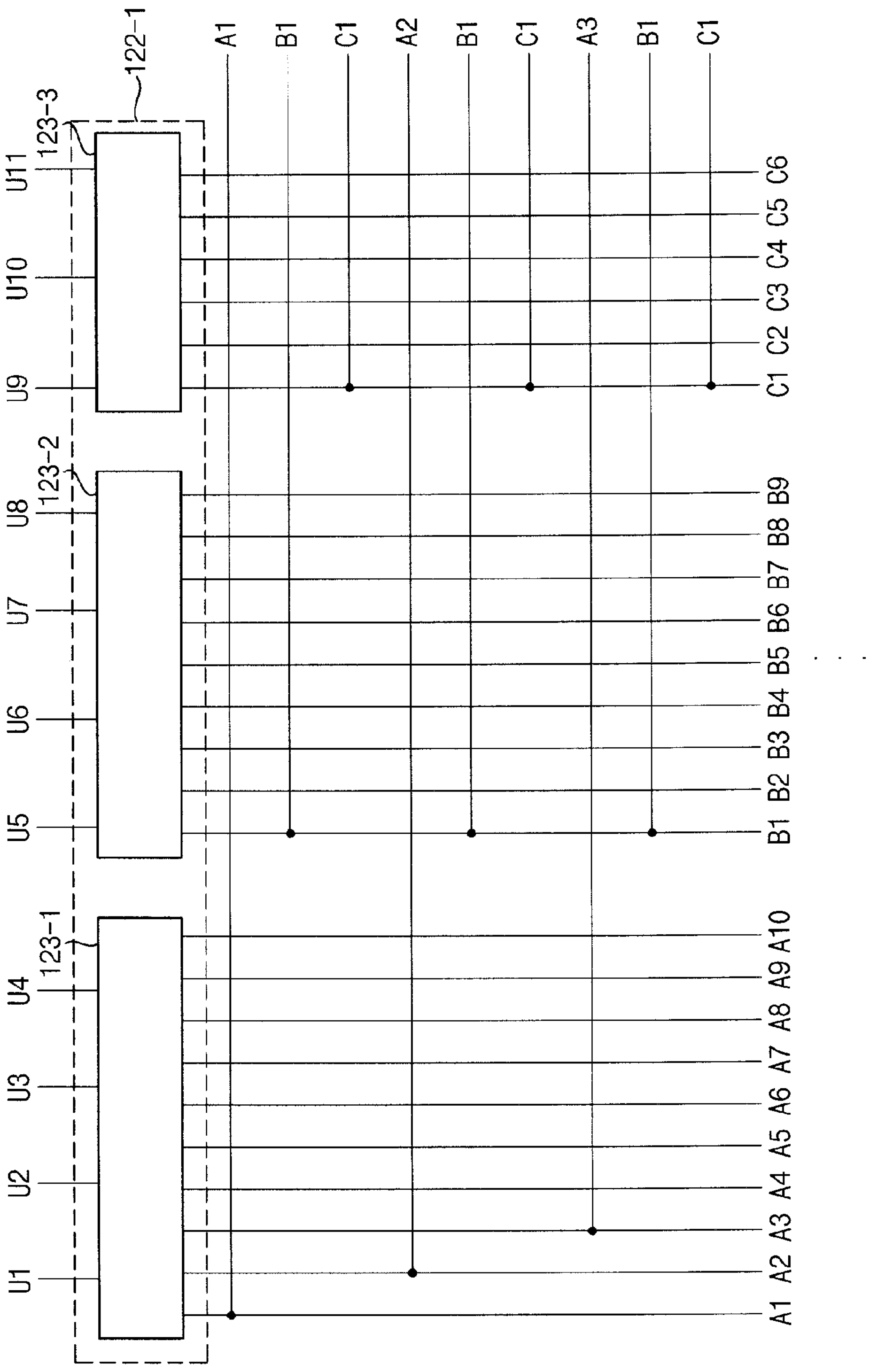
FIGS. 4A and 4B are diagrams illustrating an example in which outer signal-lines are arranged in a display panel by a scan driving unit of FIG. 3.
Figure 4B:
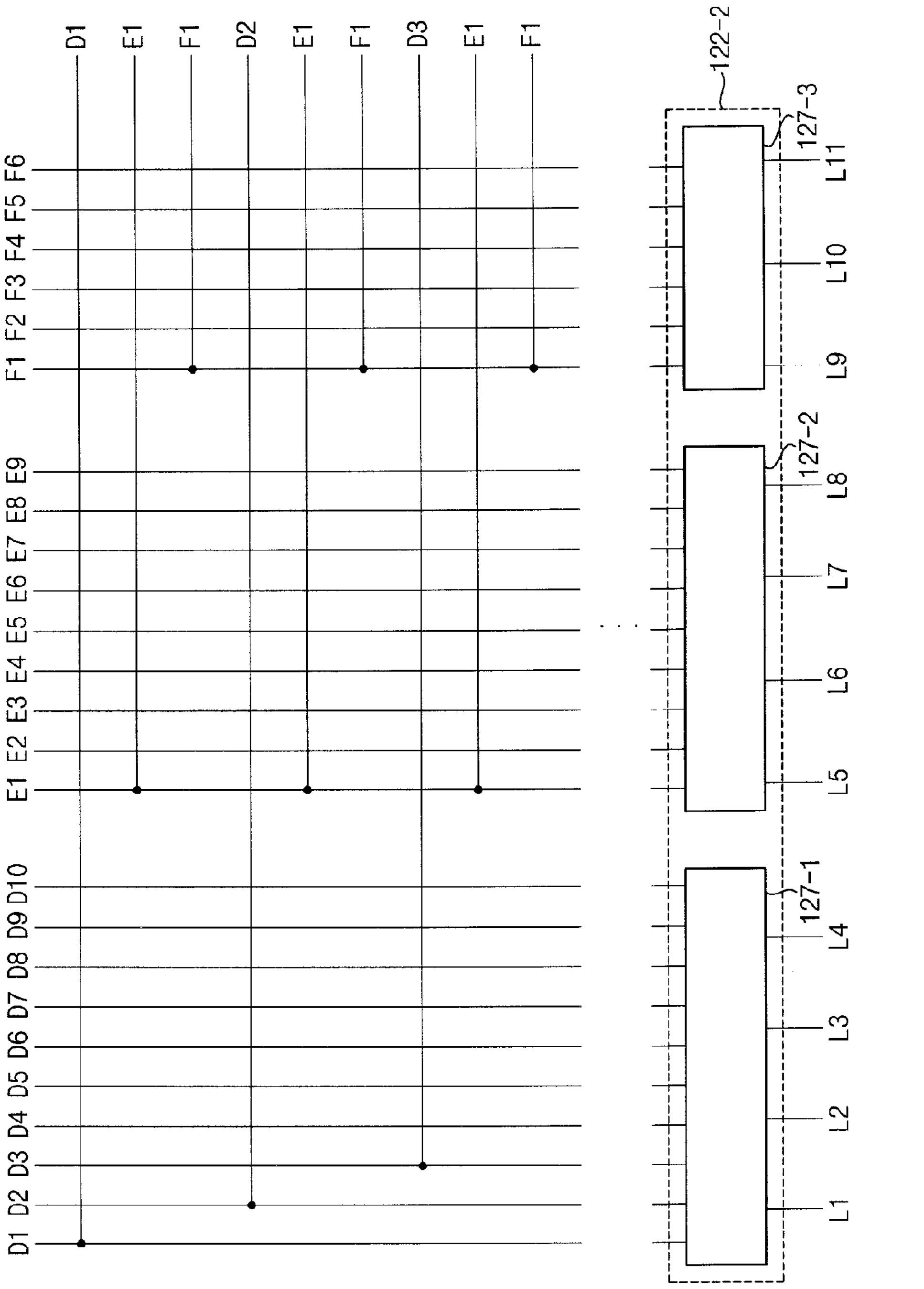

FIGS. 4A and 4B are diagrams illustrating an example in which outer signal-lines are arranged in a display panel by a scan driving unit of FIG. 3.

Referring to FIGS. 4A and 4B, FIG. 4A shows an internal structure of the first pre-decoder block 122-1, and FIG. 4B shows an internal structure of the second pre-decoder block 122-2.

The first pre-decoder block 122-1 may include a plurality of first decoders 123-1, 123-2, and 123-3 for generating the first logic signals A, B, and C based on the upper scan-line selection signals U1 through U11. In example embodiments, each of the first decoders 123-1, 123-2, and 123-3 may include a plurality of logic elements. In one example embodiment, the first pre-decoder block 122-1 may include a 4-by-10 decoder 123-1, a 4-by-9 decoder 123-2, and a 3-by-6 decoder 123-3. For example, the 4-by-10 decoder 123-1 may be related to lower-bits, the 4-by-9 decoder 123-2 may be related to middle-bits, and the 3-by-6 decoder 123-3 may be related to upper-bits. In detail, the 4-by-10 decoder 123-1 may receive the upper scan-line selection signals U1, U2, U3, and U4 related to the lower-bits to output ten lower-bit output signals A1 through A10. For this operation, the 4-by-10 decoder 123-1 may include ten 4-input OR logic elements. However, a structure of the 4-by-10 decoder 123-1 is not limited thereto. The 4-by-9 decoder 123-2 may receive the upper scan-line selection signals U5, U6, U7, and U8 related to the middle-bits to output nine middle-bit output signals B1 through B9. For this operation, the 4-by-9 decoder 123-2 may include nine 4-input OR logic elements. However, a structure of the 4-by-9 decoder 123-2 is not limited thereto. The 3-by-6 decoder 123-3 may receive the upper scan-line selection signals U9, U10, and U10 related to the upper-bits to output six upper-bit output signals C1 through C6. For this operation, the 3-by-6 decoder 123-3 may include six 3-input OR logic elements. However, a structure of the 3-by-6 decoder 123-3 is not limited thereto.

The first pre-decoder block 122-1 may generate the first logic signals A, B, and C based on the ten lower-bit output signals A1 through A10, the nine middle-bit output signals B1 through B9, and the six upper-bit output signals C1 through C6 that are output from the 4-by-10 decoder 123-1, the 4-by-9 decoder 123-2, and the 3-by-6 decoder 123-3, respectively. As illustrated in FIG. 4A, one of the ten lower-bit output signals A1 through A10 may be selected, one of the nine middle-bit output signals B1 through B9 may be selected, and one of the six upper-bit output signals C1 through C6 may be selected to generate the first logic signals A, B, and C. As a result, the first logic signals A, B, and C may have a binary form such as (A1, B1, C1), (A2, B1, C1), (A3, B1, C1), etc. Then, the first logic signals A, B, and C may be output to the first final-decoder block 124. Here, the number of signal-lines that are arranged in an outer region of the upper display region of the display panel 110 in the organic light emitting display device 100 may correspond to a sum of the number of output-lines of the first decoders 123-1, 123-2, and 123-3. That is, since the first pre-decoder block 122-1 is coupled to the first final-decoder block 124, the output-lines for outputting the ten lower-bit output signals A1 through A10, the output-lines for outputting the nine middle-bit output signals B1 through B9, and the output-lines for outputting the six upper-bit output signals C1 through C6 may be arranged in the outer region of the upper display region of the display panel 110 in the organic light emitting display device 100. In FIG. 4A, the number of output-lines for outputting the ten lower-bit output signals A1 through A10 is 10, the number of output-lines for outputting the nine middle-bit output signals B1 through B9 is 9, and the number of output-lines for outputting the six upper-bit output signals C1 through C6 is 6. Thus, the number of signal-lines that are arranged in the outer region of the upper display region of the display panel 110 in the organic light emitting display device 100 is 25 (i.e., 10+9+6=25). In addition, a multiplication of the number of output-lines of the first decoders 123-1, 123-2, and 123-3 may correspond to the number of all scan-lines SL1 through SLk of the upper display region of the display panel 110. Thus, in FIG. 4A, the number of all scan-lines SL1 through SLk of the upper display region of the display panel 110 may be 540 (i.e., 10*9*6=540). As a result, when the second pre-decoder block 122-2 has the same structure as the first pre-decoder block 122-1, the number of all scan-lines SLk+1 through SLn of the lower display region of the display panel 110 may also be 540. Therefore, an MD resolution may be implemented because the number of all scan-lines SL1 through SLn of the display panel 110 is 1080 (i.e., 540+540=1080).

The second pre-decoder block 122-2 may include a plurality of second decoders 127-1, 127-2, and 127-3 for generating the second logic signals D, E, and F based on the lower scan-line selection signals L1 through L11. In example embodiments, each of the second decoders 127-1, 127-2, and 127-3 may include a plurality of logic elements. In one example embodiment, the second pre-decoder block 122-2 may include a 4-by-10 decoder 127-1, a 4-by-9 decoder 127-2, and a 3-by-6 decoder 127-3. For example, the 4-by-10 decoder 127-1 may be related to lower-bits, the 4-by-9 decoder 127-2 may be related to middle-bits, and the 3-by-6 decoder 127-3 may be related to upper-bits. In detail, the 4-by-10 decoder 127-1 may receive the lower scan-line selection signals L1, L2, L3, and L4 related to the lower-bits to output ten lower-bit output signals D1 through D10. For this operation, the 4-by-10 decoder 127-1 may include ten 4-input OR logic elements. However, a structure of the 4-by-10 decoder 127-1 is not limited thereto. The 4-by-9 decoder 127-2 may receive the lower scan-line selection signals L5, L6, L7, and L8 related to the middle-bits to output nine middle-bit output signals E1 through E9. For this operation, the 4-by-9 decoder 127-2 may include nine 4-input OR logic elements. However, a structure of the 4-by-9 decoder 127-2 is not limited thereto. The 3-by-6 decoder 127-3 may receive the lower scan-line selection signals L9, L10, and L10 related to the upper-bits to output six upper-bit output signals F1 through F6. For this operation, the 3-by-6 decoder 127-3 may include six 3-input OR logic elements. However, a structure of the 3-by-6 decoder 127-3 is not limited thereto.

The second pre-decoder block 122-2 may generate the second logic signals D, E, and F based on the ten lower-bit output signals D1 through D10, the nine middle-bit output signals E1 through E9, and the six upper-bit output signals F1 through F6 that are output from the 4-by-10 decoder 127-1, the 4-by-9 decoder 127-2, and the 3-by-6 decoder 127-3, respectively. As illustrated in FIG. 4B, one of the ten lower-bit output signals D1 through D10 may be selected, one of the nine middle-bit output signals E1 through E9 may be selected, and one of the six upper-bit output signals F1 through F6 may be selected to generate the second logic signals D, E, and F. As a result, the second logic signals D, E, and F may have a binary form such as (D1, E1, F1), (D2, E1, F1), (D3, E1, F1), etc. Then, the second logic signals D, E, and F may be output to the second final-decoder block 126. Here, the number of signal-lines that are arranged in an outer region of the lower display region of the display panel 110 in the organic light emitting display device 100 may correspond to a sum of the number of output-lines of the second decoders 127-1, 127-2, and 127-3. That is, since the second pre-decoder block 122-2 is coupled to the second final-decoder block 126, the output-lines for outputting the ten lower-bit output signals D1 through D10, the output-lines for outputting the nine middle-bit output signals E1 through E9, and the output-lines for outputting the six upper-bit output signals F1 through F6 may be arranged in the outer region of the lower display region of the display panel 110 in the organic light emitting display device 100. In FIG. 4B, the number of output-lines for outputting the ten lower-bit output signals D1 through D10 is 10, the number of output-lines for outputting the nine middle-bit output signals E1 through E9 is 9, and the number of output-lines for outputting the six upper-bit output signals F1 through F6 is 6. Thus, the number of signal-lines that are arranged in the outer region of the lower display region of the display panel 110 in the organic light emitting display device 100 is 25 (i.e., 10+9+6=25). In addition, a multiplication of the number of output-lines of the second decoders 127-1, 127-2, and 127-3 may correspond to the number of all scan-lines SLk+1 through SLn of the lower display region of the display panel 110. Thus, in FIG. 4B, the number of all scan-lines SLk+1 through SLn of the lower display region of the display panel 110 may be 540 (i.e., 10*9*6=540). As a result, when the first pre-decoder block 122-1 has the same structure as the second pre-decoder block 122-2, the number of all scan-lines SL1 through SLk of the upper display region of the display panel 110 may also be 540. Therefore, an FED resolution may be implemented because the number of all scan-lines SL1 through SLn of the display panel 110 is 1080 (i.e., 540+540=1080).

In one example embodiment, a sum of the number of output-lines of the first decoders 123-1, 123-2, and 123-3 may be the same as a sum of the number of output-lines of the second decoders 127-1, 127-2, and 127-3. In this case, the number of all scan-lines SL1 through SLk of the upper display region of the display panel 110 may be the same as the number of all scan-lines SLk+1 through SLn of the lower display region of the display panel 110. In another example embodiment, a sum of the number of output-lines of the first decoders 123-1, 123-2, and 123-3 may be different from a sum of the number of output-lines of the second decoders 127-1, 127-2, and 127-3. In this case, the number of all scan-lines SL1 through SLk of the upper display region of the display panel 110 may be different from the number of all scan-lines SLk+1 through SLn of the lower display region of the display panel 110. As described above, the number of signal-lines that are arranged in the outer region of the upper display region of the display panel 110 may correspond to a sum of the number of output-lines of the first decoders 123-1, 123-2, and 123-3, and the number of signal-lines that are arranged in the outer region of the lower display region of the display panel 110 may correspond to a sum of the number of output-lines of the second decoders 127-1, 127-2, and 127-3. In addition, a multiplication of the number of output-lines of the first decoders 123-1,

123-2, and 123-3 may correspond to the number of all scan-lines SL1 through SLk of the upper display region of the display panel 110, and a multiplication of the number of output-lines of the second decoders 127-1, 127-2, and 127-3 may correspond to the number of all scan-lines SLk+1 through SLn of the lower display region of the display panel 110. That is, since the number of all scan-lines SL1 through SLn of the display panel 110 for implementing the MD resolution is 1080, the number of signal-lines that are arranged in the outer region of the display panel 110 may be 25 (i.e., 10+9+6=25). On the other hand, in a conventional display panel in which the upper display region is not separated from the lower display region, the number of signal-lines that are arranged in the outer region of the conventional display panel for driving 1080 (i.e., 12*10*9=1080) scan-lines SL1 through SLn may be 31 (i.e., 12+10+9=31). Therefore, the scan driving unit 120 may reduce the number of signal-lines that are arranged in the outer region of the display panel 110 by including the two-stage upper decoding structure and the two-stage lower decoding structure that are coupled to the upper display region of the display panel 110 and the lower display region of the display panel 110, respectively.

Figure 5:
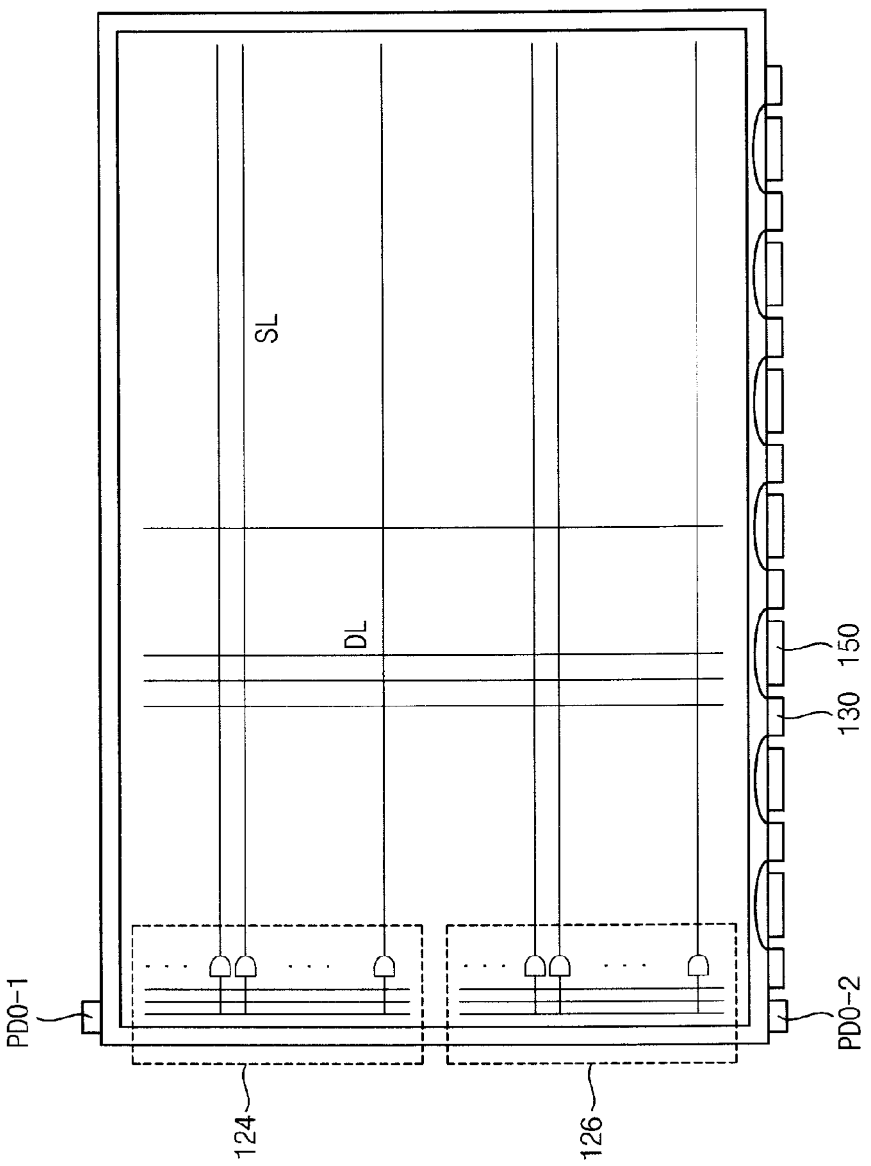
FIG. 5 is a diagram illustrating an example in which first and second final-decoder blocks of a scan driving unit of FIG. 3 are located in a display panel.

FIG. 5 is a diagram illustrating an example in which first and second final-decoder blocks of a scan driving unit of FIG. 3 are located in a display panel.

Referring to FIG. 5, it is illustrated in FIG. 5 that the first final-decoder block 124 and the second final-decoder block 126 of the scan driving unit 120 are located inside the display panel 110. As illustrated in FIG. 5, the first final-decoder block 124, the second final-decoder block 126, and the signal lines coupled thereto may be located in one outer region (i.e., one side) of the display panel 110. The signal-lines that are extended from an output terminal block PDQ-1 of the first pre-decoder block 122-1, where the first pre-decoder block 122-1 is located outside the display panel 110 (e.g., in an upper direction), may be arranged in one outer region of the display panel 110. Likewise, the signal-lines that are extended from an output terminal block PDQ-2 of the second pre-decoder block 122-2, where the second pre-decoder block 122-2 is located outside the display panel 110 (e.g., in a lower direction), may be arranged in one outer region of the display panel 110. The display panel 110 may receive a data signal from a data driving unit 130 (e.g., a data driving IC), and may receive a power voltage from a power unit 150 (e.g., a power supply FPC). FIG. 5 shows the display panel 110 having an MD resolution. Here, the number of all scan-lines SL1 through SLk of the upper display region of the display panel 110 may be 540, the number of all scan-lines SLk+1 through SLn of the lower display region of the display panel 110 may be 540, and the number of all scan-lines SL1 through SLn of the display panel 110 may be 1080 (i.e., 540+540=1080). In example embodiments, the number of signal-lines that are arranged in the outer region of the display panel 110 may be 25 (i.e., 10+9+6=25). On the other hand, the number of signal-lines that are arranged in the outer region of the conventional display panel in which the upper display region is not separated from the lower display region may be 31 (i.e., 12+10+9=31). For example, assuming that a width of one signal-line is 90 um, and a width between two signal-lines is 30 um, the dead space of the display panel 110 may be 3000 um (i.e., (90 um+30 um)*25=3000 um). On the other hand, the dead space of the conventional display panel may be 3720 um (i.e., (90 um+30 um)*31=3720 um). As a result, compared to the conventional display panel, the display panel 110 reduces the dead space by 720 um (i.e., (90 um+30 um)*6=720 um) in one outer region of the display panel 110.

Figure 6:
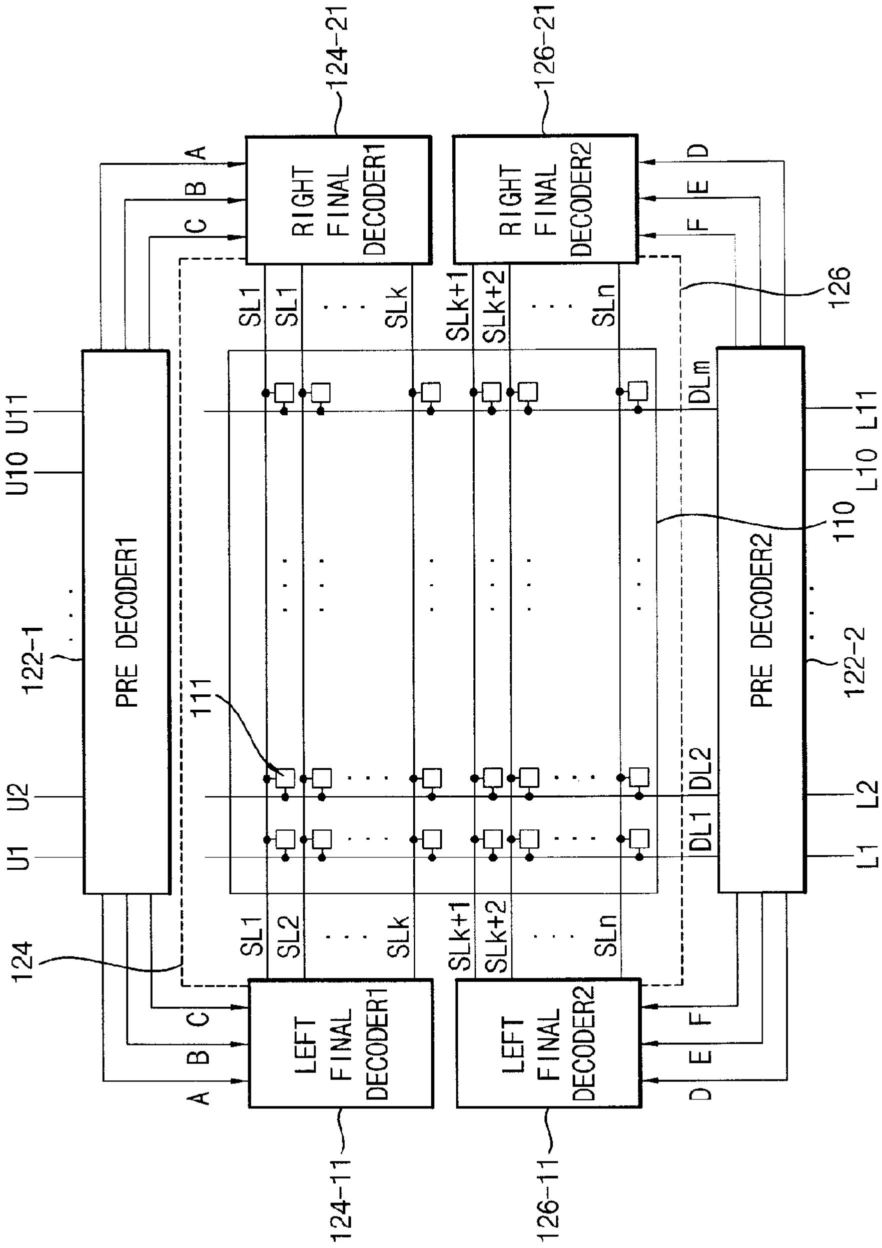
FIG. 6 is a block diagram illustrating another example of a scan driving unit included in an organic light emitting display device of FIG. 1.

FIG. 6 is a block diagram illustrating another example of a scan driving unit included in an organic light emitting display device of FIG. 1.

Referring to FIG. 6, the scan driving unit 120 includes a first pre-decoder block 122-1, a second pre-decoder block 122-2, a first final-decoder block 124, and a second final-decoder block 126. The display panel 110 includes a plurality of pixel circuits 111 that are arranged at locations corresponding to crossing points of the scan-lines SL1 through SLn and the data-lines DL1 through DLm. As described above, the first pre-decoder block 122-1 and the first final-decoder block 124 correspond to the two-stage upper decoding structure of the scan driving unit 120, and the second pre-decoder block 122-2 and the second final-decoder block 126 correspond to the two-stage lower decoding structure of the scan driving unit 120.

The first pre-decoder block 122-1 receives the upper scan-line selection signals U1 through U11 for selecting one of the upper scan-lines SL1 through SLk that are arranged in the upper display region of the display panel 110, and may output the first logic signals A, B, and C based on the upper scan-line selection signals U1 through U11. The second pre-decoder block 122-2 may receive the lower scan-line selection signals L1 through L11 for selecting one of the lower scan-lines SLk+1 through SLn that are arranged in the lower display region of the display panel 110, and may output the second logic signals D, E, and F based on the lower scan-line selection signals L1 through L11. Although it is illustrated in FIG. 6 that the first and second pre-decoder blocks 122-1 and 122-2 and the first and second final-decoder blocks 124 and 126 are located outside the display panel 110, it should be understood that the first and second pre-decoder blocks 122-1 and 122-2 are located outside the display panel 110, and the first and second final-decoder blocks 124 and 126 are located inside the display panel 110. According to some example embodiments, the first and second pre-decoder blocks 122-1 and 122-2 may be included in the timing control unit 150 of the organic light emitting display device 100. In addition, the first and second final-decoder blocks 124 and 126 may be included in the display panel 110 of the organic light emitting display device 100.

The first final-decoder block 124 may be coupled between the upper display region of the display panel 110 and the first pre-decoder block 122-1, and may select one of the upper scan-lines SL1 through SLk that are arranged in the upper display region of the display panel 110 based on the first logic signals A, B, and C. Here, the first final-decoder block 124 may include a first left final-decoder block 124-11 and a first right final-decoder block 124-21. The first left final-decoder block 124-11 and the first right final-decoder block 124-21 may share the upper scan-lines SL1 through SLk. Thus, the first left final-decoder block 124-11 and the first right final-decoder block 124-21 may receive the first logic signals A, B, and C, and may control a voltage pulse of the scan signal for selecting one of the upper scan-lines SL1 through SLk at a high speed. As a result, a RC delay may be reduced. The second final-decoder block 126 may be coupled between the lower display region of the display panel 110 and the second pre-decoder block 122-2, and may select one of the lower scan-lines SLk+1 through SLn that are arranged in the lower display region of the display panel 110 based on the second logic signals D, E, and F. Here, the second final-decoder block 126 may include a second left final-decoder block 126-11 and a second right final-decoder block 126-21. The second left final-decoder block 126-11 and the second right final-decoder block 126-21 may share the lower scan-lines SLk+1 through SLn. Thus, the second left final-decoder block 126-11 and the second right final-decoder block 126-21 may receive the second logic signals D, E, and F, and may control a voltage pulse of the scan signal for selecting one of the lower scan-lines SLk+1 through SLn at a high speed. As a result, a RC delay may be reduced.

As described above, the first pre-decoder block 122-1 may be coupled to the first final-decoder block 124 to select one of the upper scan-lines SL1 through SLk that are arranged in the upper display region of the display panel 110, the second pre-decoder block 122-2 may be coupled to the second final-decoder block 126 to select one of the lower scan-lines SLk+1 through SLn that are arranged in the lower display region of the display panel 110, and the first final-decoder block 124 may be separated from the second final-decoder block 126 in the display panel 110. Although the first final-decoder block 124 is separated from the second final-decoder block 126, it should be understood that the upper display region and the lower display region of the display panel 110 are not driven independently of each other. Therefore, when a value of a line counter that counts the scan-lines SL1 through SLn indicates the upper display region of the display panel 110, the value of the line counter may be matched to the upper scan-line selection signals U1 through U11. On the other hand, when the value of the line counter indicates the lower display region of the display panel 110, a value generated by subtracting the number of the upper scan-lines SL1 through SLk from the value of the line counter may be matched to the lower scan-line selection signals L1 through L11.

For example, when an MD resolution is implemented, the number of total scan-lines SL1 through SLn of the display panel 110 may be 1080. For convenience of descriptions, it is assumed that the number of the upper scan-lines SL1 through SLk is 540, and the number of the lower scan-lines SLk+1 through SLn is also 540. In this case, if the value of the line counter is between 0 and 539, the upper display region of the display panel 110 may be selected, and the value of the line counter may be matched to the upper scan-line selection signals U1 through U11. On the other hand, if the value of the line counter is between 540 and 1079, the lower display region of the display panel 110 may be selected, and the value generated by subtracting 540 (i.e., the number of the upper scan-lines SL1 through SLk) from the value of the line counter may be matched to the lower scan-line selection signals L1 through L11. Although it is illustrated in FIG. 6 that the first pre-decoder block 122-1 receives eleven upper scan-line selection signals U1 through U11, the second pre-decoder block 122-2 receives eleven lower scan-line selection signals L1 through L11, the first final-decoder block 124 receives three first logic signals A, B, and C, and the second final-decoder block 126 receives three second logic signals D, E, and F, the number of signals is not limited thereto. That is, the number of signals may be variously changed according to required conditions. As described above, the scan driving unit 120 may have the two-stage upper decoding structure and the two-stage lower decoding structure (i.e., the upper display region of the display panel 110 and the lower display region of the display panel 110 are coupled to the first final-decoder block 124 and the second final-decoder block 126, respectively, and the first final-decoder block 124 and the second final-decoder block 126 are coupled to the first pre-decoder block 122-1 and the second pre-decoder block 122-2, respectively.). Thus, the scan driving unit 120 reduces the dead space of the display panel 110 by reducing the number of outer signal-lines of the display panel 110.

Figure 7:
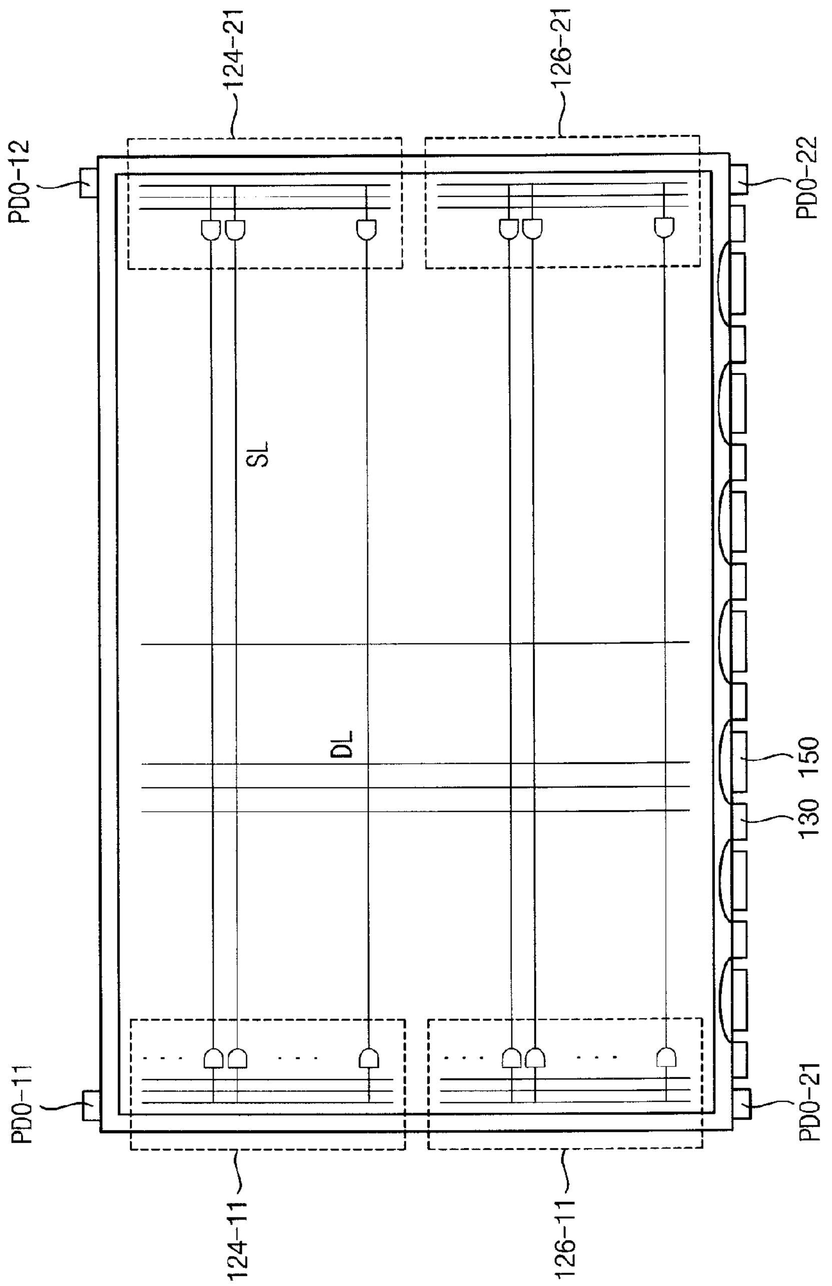
FIG. 7 is a diagram illustrating an example in which first and second final-decoder blocks of a scan driving unit of FIG. 6 are located in a display panel.

FIG. 7 is a diagram illustrating an example in which first and second final-decoder blocks of a scan driving unit of FIG. 6 are located in a display panel.

Referring to FIG. 7, it is illustrated in FIG. 7 that the first final-decoder block 124-11 and 124-21 and the second final-decoder block 126-11 and 126-21 of the scan driving unit 120 are located inside the display panel 110. As illustrated in FIG. 7, signal-lines that are extended from output terminal blocks PDQ-11 and PDQ-12 of the first pre-decoder block 122-1, where the first pre-decoder block 122-1 is located outside the display panel 110 (e.g., in an upper direction), may be arranged in both outer regions (i.e., both sides) of the display panel 110. Likewise, signal-lines that are extended from output terminal blocks PDQ-21 and PDQ-22 of the second pre-decoder block 122-2, where the second pre-decoder block 122-2 is located outside the display panel 110 (e.g., in a lower direction), may be arranged in both outer regions (i.e., both sides) of the display panel 110. The display panel 110 may receive a data signal from a data driving unit 130 (e.g., a data driving IC), and may receive a power voltage from a power unit 150 (e.g., a power supply FPC). FIG. 7 shows the display panel 110 having an FED resolution. Here, the number of all scan-lines SL1 through SLk of the upper display region of the display panel 110 may be 540, the number of all scan-lines SLk+1 through SLn of the lower display region of the display panel 110 may be 540, and the number of all scan-lines SL1 through SLn of the display panel 110 may be 1080 (i.e., 540+540=1080). In example embodiments, the number of signal-lines that are arranged in the outer region of the display panel 110 may be 25 (i.e., 10+9+6=25). On the other hand, the number of signal-lines that are arranged in the outer region of the conventional display panel in which the upper display region is not separated from the lower display region may be 31 (i.e., 12+10+9=31). For example, assuming that a width of one signal-line is 90 um, and a width between two signal-lines is 30 um, a dead space of the display panel 110 may be 3000 um (i.e., (90 um+30 um)*25=3000 um). On the other hand, a dead space of the conventional display panel may be 3720 um (i.e., (90 um+30 um)*31=3720 um). As a result, compared to the conventional display panel, the display panel 110 may reduce a dead space by 720 um (i.e., (90 um+30 um)*6=720 um) in one outer region of the display panel 110 (i.e., by 1440 um in both outer regions of the display panel 110).

Figure 8:
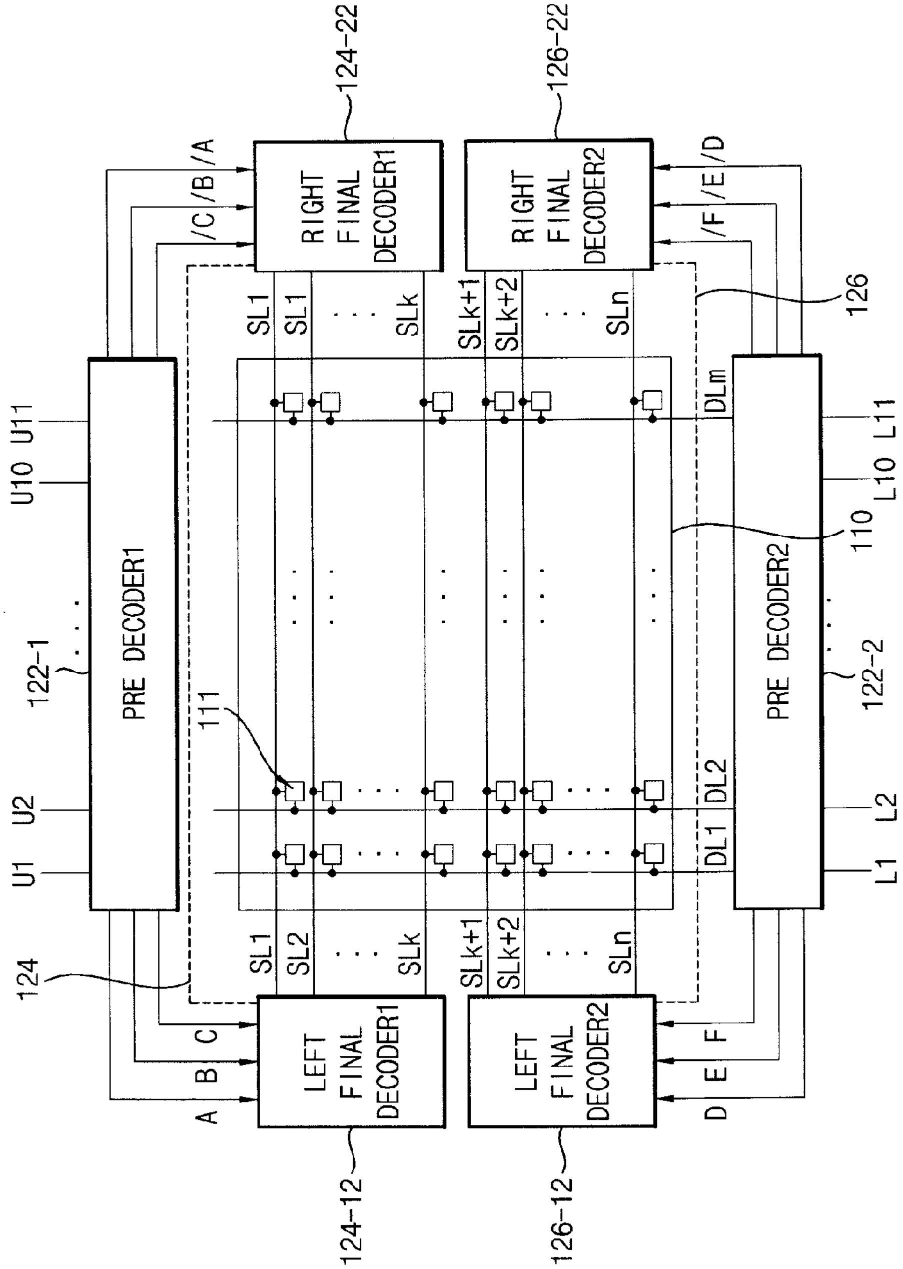
FIG. 8 is a block diagram illustrating still another example of a scan driving unit included in an organic light emitting display device of FIG. 1.

FIG. 8 is a block diagram illustrating still another example of a scan driving unit included in an organic light emitting display device of FIG. 1.

Referring to FIG. 8, the scan driving unit 120 includes a first pre-decoder block 122-1, a second pre-decoder block 122-2, a first final-decoder block 124, and a second final-decoder block 126. The display panel 110 includes a plurality of pixel circuits 111 that are arranged at locations corresponding to crossing points of the scan-lines SL1 through SLn and the data-lines DL1 through DLm. As described above, the first pre-decoder block 122-1 and the first final-decoder block 124 correspond to the two-stage upper decoding structure of the scan driving unit 120, and the second pre-decoder block 122-2 and the second final-decoder block 126 correspond to the two-stage lower decoding structure of the scan driving unit 120.

The first pre-decoder block 122-1 receives the upper scan-line selection signals U1 through U11 for selecting one of the upper scan-lines SL1 through SLk that are arranged in the upper display region of the display panel 110, and outputs the first logic signals A, B, and C, and the first inverted logic signals /A, /B, and /C based on the upper scan-line selection signals U1 through U11. Here, the first inverted logic signals /A, /B, and /C are generated by inverting the first logic signals A, B, and C. The second pre-decoder block 122-2 receives the lower scan-line selection signals L1 through L11 for selecting one of the lower scan-lines SLk+1 through SLn that are arranged in the lower display region of the display panel 110, and may output the second logic signals D, E, and F, and the second inverted logic signals /D, /E, and /F based on the lower scan-line selection signals L1 through L11. Here, the second inverted logic signals /D, /E, and /F are generated by inverting the second logic signals D, E, and F. Although it is illustrated in FIG. 8 that the first and second pre-decoder blocks 122-1 and 122-2 and the first and second final-decoder blocks 124 and 126 are located outside the display panel 110, it should be understood that the first and second pre-decoder blocks 122-1 and 122-2 are located outside the display panel 110, and the first and second final-decoder blocks 124 and 126 are located inside the display panel 110. According to some example embodiments, the first and second pre-decoder blocks 122-1 and 122-2 may be included in the timing control unit 150 of the organic light emitting display device 100. In addition, the first and second final-decoder blocks 124 and 126 may be included in the display panel 110 of the organic light emitting display device 100.

The first final-decoder block 124 may be coupled between the upper display region of the display panel 110 and the first pre-decoder block 122-1, and may select one of the upper scan-lines SL1 through SLk that are arranged in the upper display region of the display panel 110 based on the first logic signals A, B, and C, and the first inverted logic signals /A, /B, and /C. Here, the first final-decoder block 124 may include a first left final-decoder block 124-12 and a first right final-decoder block 124-22. The first left final-decoder block 124-12 and the first right final-decoder block 124-22 may share the upper scan-lines SL1 through SLk. Thus, the first left final-decoder block 124-12 and the first right final-decoder block 124-22 may receive the first logic signals A, B, and C, and the first inverted logic signals /A, /B, and /C, respectively, and may control a voltage pulse of the scan signal for selecting one of the upper scan-lines SL1 through SLk at a high speed by performing a push-and-pull operation for sinking or supplying currents between the first left final-decoder block 124-12 and the first right final-decoder block 124-22.

The second final-decoder block 126 may be coupled between the lower display region of the display panel 110 and the second pre-decoder block 122-2, and may select one of the lower scan-lines SLk+1 through SLn that are arranged in the lower display region of the display panel 110 based on the second logic signals D, E, and F, and the second inverted logic signals /D, /E, and /F. Here, the second final-decoder block 126 may include a second left final-decoder block 126-12 and a second right final-decoder block 126-22. The second left final-decoder block 126-12 and the second right final-decoder block 126-22 may share the lower scan-lines SLk+1 through SLn. Thus, the second left final-decoder block 126-12 and the second right final-decoder block 126-22 may receive the second logic signals D, E, and F, and the second inverted logic signals /D, /E, and /F, respectively, and may control a voltage pulse of the scan signal for selecting one of the lower scan-lines SLk+1 through SLn at a high speed by performing a push-and-pull operation for sinking or supplying currents between the second left final-decoder block 126-12 and the second right final-decoder block 126-22.

As described above, the first pre-decoder block 122-1 may be coupled to the first final-decoder block 124 to select one of the upper scan-lines SL1 through SLk that are arranged in the upper display region of the display panel 110, the second pre-decoder block 122-2 may be coupled to the second final-decoder block 126 to select one of the lower scan-lines SLk+1 through SLn that are arranged in the lower display region of the display panel 110, and the first final-decoder block 124 may be separated from the second final-decoder block 126 in the display panel 110. Although the first final-decoder block 124 is separated from the second final-decoder block 126, it should be understood that the upper display region and the lower display region of the display panel 110 are not driven independently of each other. Therefore, when a value of a line counter that counts the scan-lines SL1 through SLn indicates the upper display region of the display panel 110, the value of the line counter may be matched to the upper scan-line selection signals U1 through U11. On the other hand, when the value of the line counter indicates the lower display region of the display panel 110, a value generated by subtracting the number of the upper scan-lines SL1 through SLk from the value of the line counter may be matched to the lower scan-line selection signals L1 through L11.

For example, when an FHD resolution is implemented, the number of total scan-lines SL1 through SLn of the display panel 110 may be 1080. For convenience of descriptions, it is assumed that the number of the upper scan-lines SL1 through SLk is 540, and the number of the lower scan-lines SLk+1 through SLn is also 540. In this case, if the value of the line counter is between 0 and 539, the upper display region of the display panel 110 may be selected, and the value of the line counter may be matched to the upper scan-line selection signals U1 through U11. On the other hand, if the value of the line counter is between 540 and 1079, the lower display region of the display panel 110 may be selected, and the value generated by subtracting 540 (i.e., the number of the upper scan-lines SL1 through SLk) from the value of the line counter may be matched to the lower scan-line selection signals L1 through L11. Although it is illustrated in FIG. 8 that the first pre-decoder block 122-1 receives eleven upper scan-line selection signals U1 through U11, the second pre-decoder block 122-2 receives eleven lower scan-line selection signals L1 through L11, the first final-decoder block 124 receives three first logic signals A, B, and C, and three first inverted logic signals /A, /B, and /C, and the second final-decoder block 126 receives three second logic signals D, E, and F, and three second inverted logic signals /D, /E, and /F, the number of signals is not limited thereto. That is, the number of signals may be variously changed according to required conditions. As described above, the scan driving unit 120 may have the two-stage upper decoding structure and the two-stage lower decoding structure (i.e., the upper display region of the display panel 110 and the lower display region of the display panel 110 are coupled to the first final-decoder block 124 and the second final-decoder block 126, respectively, and the first final-decoder block 124 and the second final-decoder block 126 are coupled to the first pre-decoder block 122-1 and the second pre-decoder block 122-2, respectively.). Thus, the scan driving unit 120 may reduce a dead space of the display panel 110 by reducing the number of outer signal-lines of the display panel 110.

Figure 9A:
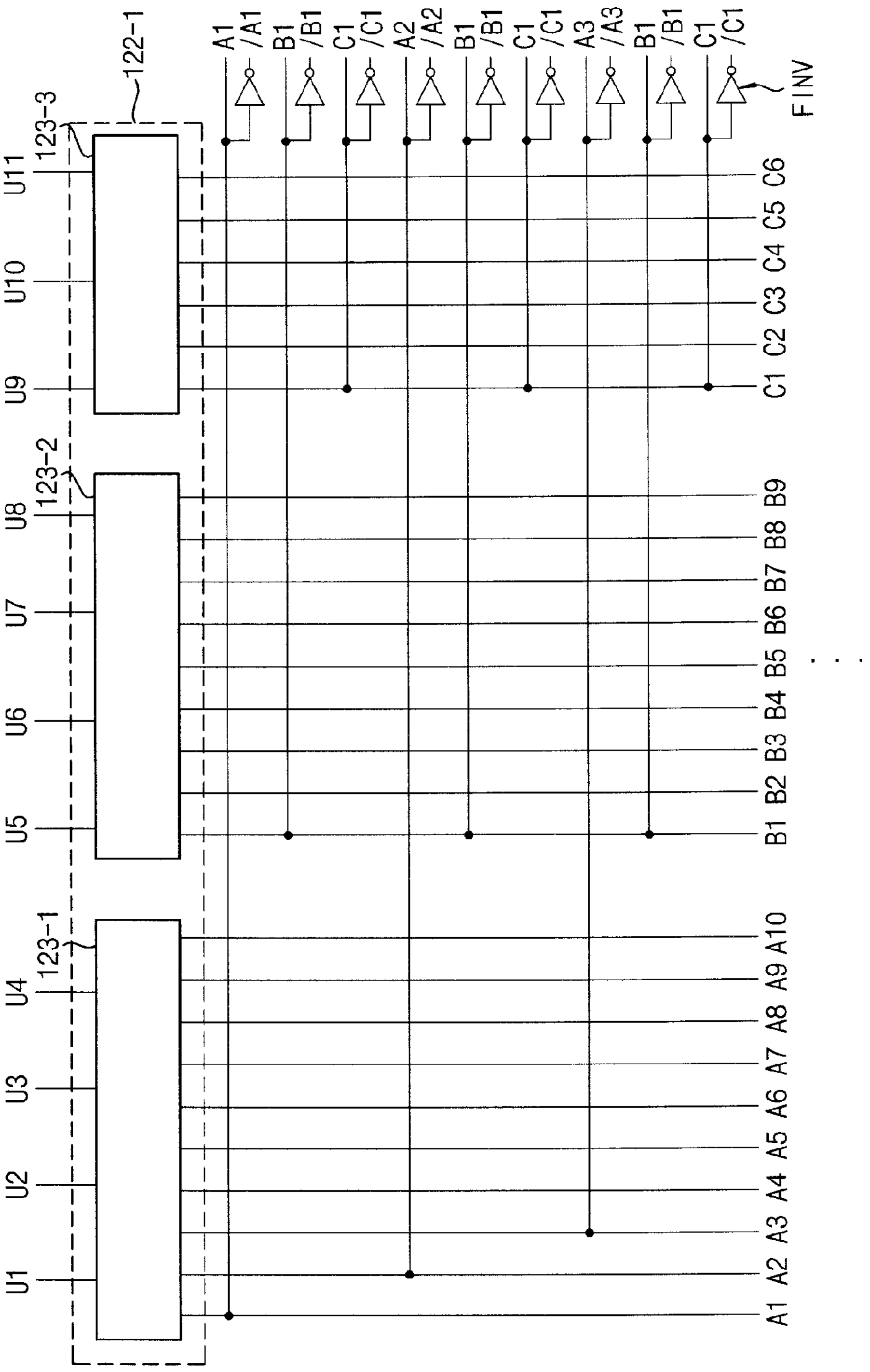
FIGS. 9A and 9B are diagrams illustrating an example in which outer signal-lines are arranged in a display panel by a scan driving unit of FIG. 8.
Figure 9B:
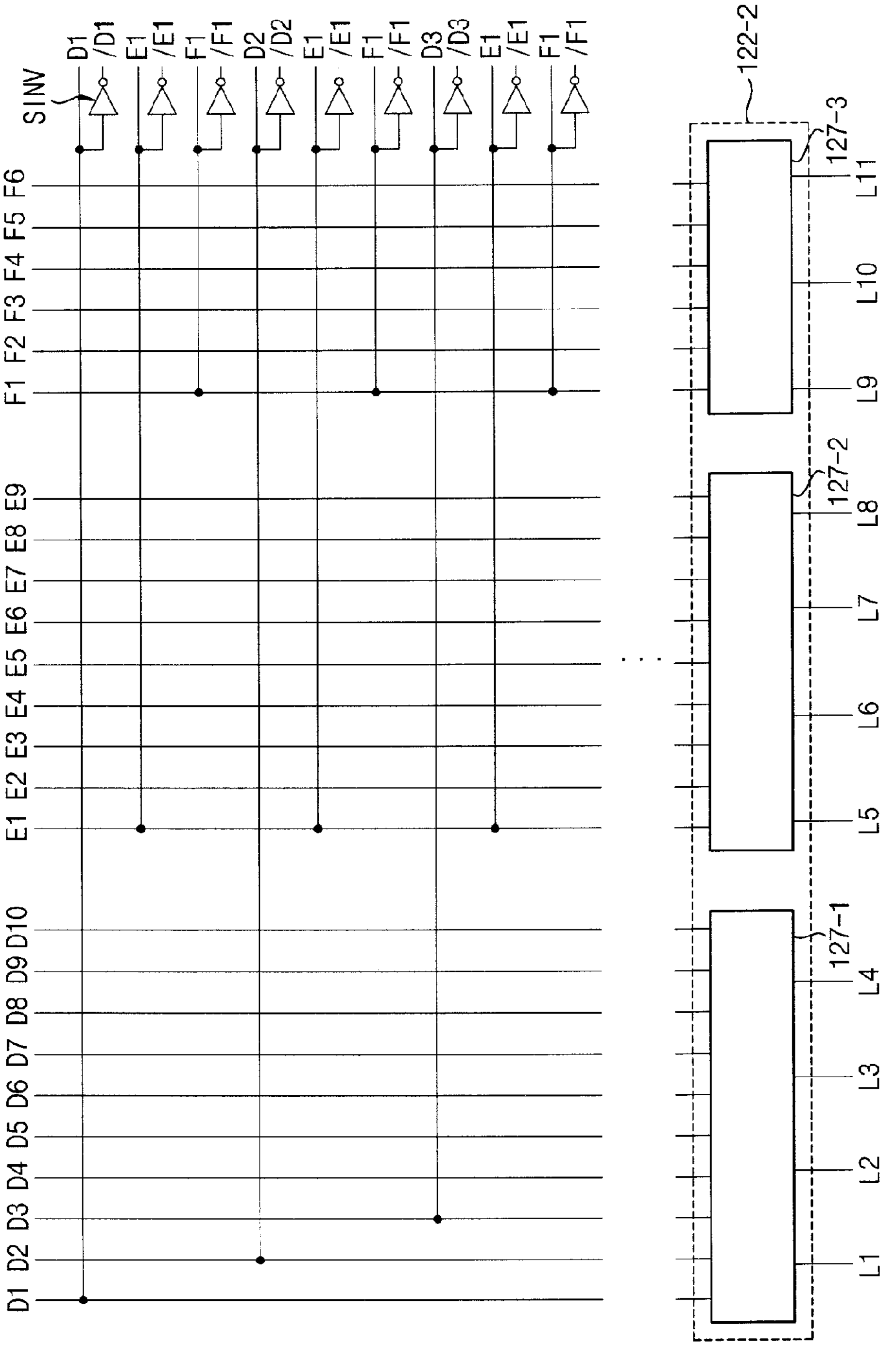

FIGS. 9A and 9B are diagrams illustrating an example in which outer signal-lines are arranged in a display panel by a scan driving unit of FIG. 8.

Referring to FIGS. 9A and 9B, FIG. 9A shows an internal structure of the first pre-decoder block 122-1, and FIG. 9B shows an internal structure of the second pre-decoder block 122-2.

The first pre-decoder block 122-1 may include a plurality of first decoders 123-1, 123-2, and 123-3 for generating the first logic signals A, B, and C based on the upper scan-line selection signals U1 through U11, and a plurality of first inverters FINV for generating the first inverted logic signals /A, /B, and /C based on the first logic signals A, B, and C. In example embodiments, each of the first decoders 123-1, 123-2, and 123-3 may include a plurality of logic elements. In one example embodiment, the first pre-decoder block 122-1 may include a 4-by-10 decoder 123-1, a 4-by-9 decoder 123-2, and a 3-by-6 decoder 123-3. For example, the 4-by-10 decoder 123-1 may be related to lower-bits, the 4-by-9 decoder 123-2 may be related to middle-bits, and the 3-by-6 decoder 123-3 may be related to upper-bits. In detail, the 4-by-10 decoder 123-1 may receive the upper scan-line selection signals U1, U2, U3, and U4 related to the lower-bits to output ten lower-bit output signals A1 through A10. For this operation, the 4-by-10 decoder 123-1 may include ten 4-input OR logic elements. However, a structure of the 4-by-10 decoder 123-1 is not limited thereto. The 4-by-9 decoder 123-2 may receive the upper scan-line selection signals U5, U6, U7, and U8 related to the middle-bits to output nine middle-bit output signals B1 through B9. For this operation, the 4-by-9 decoder 123-2 may include nine 4-input OR logic elements. However, a structure of the 4-by-9 decoder 123-2 is not limited thereto. The 3-by-6 decoder 123-3 may receive the upper scan-line selection signals U9, U10, and Ulf related to the upper-bits to output six upper-bit output signals C1 through C6. For this operation, the 3-by-6 decoder 123-3 may include six 3-input OR logic elements. However, a structure of the 3-by-6 decoder 123-3 is not limited thereto.

The first pre-decoder block 122-1 may generate the first logic signals A, B, and C based on the ten lower-bit output signals A1 through A10, the nine middle-bit output signals B1 through B9, and the six upper-bit output signals C1 through C6 that are output from the 4-by-10 decoder 123-1, the 4-by-9 decoder 123-2, and the 3-by-6 decoder 123-3, respectively. As illustrated in FIG. 9A, one of the ten lower-bit output signals A1 through A10 may be selected, one of the nine middle-bit output signals B1 through B9 may be selected, and one of the six upper-bit output signals C1 through C6 may be selected to generate the first logic signals A, B, and C. As a result, the first logic signals A, B, and C may have a binary form such as (A1, B1, C1), (A2, B1, C1), (A3, B1, C1), etc. Then, the first logic signals A, B, and C may be output to the first final-decoder block 124. At the same time, the first pre-decoder block 122-1 may generate the first inverted logic signals /A, /B, and /C by inverting the ten lower-bit output signals A1 through A10, the nine middle-bit output signals B1 through B9, and the six upper-bit output signals C1 through C6 using the first inverters FINV. Thus, as illustrated in FIG. 9A, the first inverted logic signals /A, /B, and /C may have a binary form such as (/A1, /B1, /C1), (/A2, /B1, /C1), (/A3, /B1, /C1), etc. Then, the first inverted logic signals /A, /B, and /C may also be output to the first final-decoder block 124.

Here, the number of signal-lines that are arranged in an outer region of the upper display region of the display panel 110 in the organic light emitting display device 100 may correspond to a sum of the number of output-lines of the first decoders 123-1, 123-2, and 123-3. That is, since the first pre-decoder block 122-1 is coupled to the first final-decoder block 124, the output-lines for outputting the ten lower-bit output signals A1 through A10, the output-lines for outputting the nine middle-bit output signals B1 through B9, and the output-lines for outputting the six upper-bit output signals C1 through C6 may be arranged in the outer region of the upper display region of the display panel 110 in the organic light emitting display device 100. In FIG. 9A, the number of output-lines for outputting the ten lower-bit output signals A1 through A10 is 10, the number of output-lines for outputting the nine middle-bit output signals B1 through B9 is 9, and the number of output-lines for outputting the six upper-bit output signals C1 through C6 is 6. Thus, the number of signal-lines that are arranged in the outer region of the upper display region of the display panel 110 in the organic light emitting display device 100 is 25 (i.e., 10+9+6=25). In addition, a multiplication of the number of output-lines of the first decoders 123-1, 123-2, and 123-3 may correspond to the number of all scan-lines SL1 through SLk of the upper display region of the display panel 110. Thus, in FIG. 9A, the number of all scan-lines SL1 through SLk of the upper display region of the display panel 110 may be 540 (i.e., 10*9*6=540). As a result, when the second pre-decoder block 122-2 has the same structure as the first pre-decoder block 122-1, the number of all scan-lines SLk+1 through SLn of the lower display region of the display panel 110 may also be 540. Therefore, an MD resolution may be implemented because the number of all scan-lines SL1 through SLn of the display panel 110 is 1080 (i.e., 540+540=1080).

The second pre-decoder block 122-2 may include a plurality of second decoders 127-1, 127-2, and 127-3 for generating the second logic signals D, E, and F based on the lower scan-line selection signals L1 through L11, and a plurality of second inverters SINV for generating the second inverted logic signals /D, /E, and /F based on the second logic signals D, E, and F. In example embodiments, each of the second decoders 127-1, 127-2, and 127-3 may include a plurality of logic elements. In one example embodiment, the second pre-decoder block 122-2 may include a 4-by-10 decoder 127-1, a 4-by-9 decoder 127-2, and a 3-by-6 decoder 127-3. For example, the 4-by-10 decoder 127-1 may be related to lower-bits, the 4-by-9 decoder 127-2 may be related to middle-bits, and the 3-by-6 decoder 127-3 may be related to upper-bits. In detail, the 4-by-10 decoder 127-1 may receive the lower scan-line selection signals L1, L2, L3, and L4 related to the lower-bits to output ten lower-bit output signals D1 through D10. For this operation, the 4-by-10 decoder 127-1 may include ten 4-input OR logic elements. However, a structure of the 4-by-10 decoder 127-1 is not limited thereto. The 4-by-9 decoder 127-2 may receive the lower scan-line selection signals L5, L6, L7, and L8 related to the middle-bits to output nine middle-bit output signals E1 through E9. For this operation, the 4-by-9 decoder 127-2 may include nine 4-input OR logic elements. However, a structure of the 4-by-9 decoder 127-2 is not limited thereto. The 3-by-6 decoder 127-3 may receive the lower scan-line selection signals L9, L10, and L10 related to the upper-bits to output six upper-bit output signals F1 through F6. For this operation, the 3-by-6 decoder 127-3 may include six 3-input OR logic elements. However, a structure of the 3-by-6 decoder 127-3 is not limited thereto.

The second pre-decoder block 122-2 may generate the second logic signals D, E, and F based on the ten lower-bit output signals D1 through D10, the nine middle-bit output signals E1 through E9, and the six upper-bit output signals F1 through F6 that are output from the 4-by-10 decoder 127-1, the 4-by-9 decoder 127-2, and the 3-by-6 decoder 127-3, respectively. As illustrated in FIG. 9B, one of the ten lower-bit output signals D1 through D10 may be selected, one of the nine middle-bit output signals E1 through E9 may be selected, and one of the six upper-bit output signals F1 through F6 may be selected to generate the second logic signals D, E, and F. As a result, the second logic signals D, E, and F may have a binary form such as (D1, E1, F1), (D2, E1, F1), (D3, E1, F1), etc. Then, the second logic signals D, E, and F may be output to the second final-decoder block 126. At the same time, the second pre-decoder block 122-2 may generate the second inverted logic signals /D, /E, and /F by inverting the ten lower-bit output signals D1 through D10, the nine middle-bit output signals E1 through E9, and the six upper-bit output signals F1 through F6 using the second inverters SINV. As a result, the second inverted logic signals /D, /E, and /F may have a binary form such as (/D1, /E1, /F1), (/D2, /E1, /F1), (/D3, /E1, /F1), etc. Then, the second inverted logic signals /D, /E, and /F may be output to the second final-decoder block 126.

Here, the number of signal-lines that are arranged in an outer region of the lower display region of the display panel 110 in the organic light emitting display device 100 may correspond to a sum of the number of output-lines of the second decoders 127-1, 127-2, and 127-3. That is, since the second pre-decoder block 122-2 is coupled to the second final-decoder block 126, the output-lines for outputting the ten lower-bit output signals D1 through D10, the output-lines for outputting the nine middle-bit output signals E1 through E9, and the output-lines for outputting the six upper-bit output signals F1 through F6 may be arranged in the outer region of the lower display region of the display panel 110 in the organic light emitting display device 100. In FIG. 9B, the number of output-lines for outputting the ten lower-bit output signals D1 through D10 is 10, the number of output-lines for outputting the nine middle-bit output signals E1 through E9 is 9, and the number of output-lines for outputting the six upper-bit output signals F1 through F6 is 6. Thus, the number of signal-lines that are arranged in the outer region of the lower display region of the display panel 110 in the organic light emitting display device 100 is 25 (i.e., 10+9+6=25). In addition, a multiplication of the number of output-lines of the second decoders 127-1, 127-2, and 127-3 may correspond to the number of all scan-lines SLk+1 through SLn of the lower display region of the display panel 110. Thus, in FIG. 9B, the number of all scan-lines SLk+1 through SLn of the lower display region of the display panel 110 may be 540 (i.e., 10*9*6=540). As a result, when the first pre-decoder block 122-1 has the same structure as the second pre-decoder block 122-2, the number of all scan-lines SL1 through SLk of the upper display region of the display panel 110 may also be 540. Therefore, an MD resolution may be implemented because the number of all scan-lines SL1 through SLn of the display panel 110 is 1080 (i.e., 540+540=1080).

In one example embodiment, a sum of the number of output-lines of the first decoders 123-1, 123-2, and 123-3 may be the same as a sum of the number of output-lines of the second decoders 127-1, 127-2, and 127-3. In this case, the number of all scan-lines SL1 through SLk of the upper display region of the display panel 110 may be the same as the number of all scan-lines SLk+1 through SLn of the lower display region of the display panel 110. In another example embodiment, a sum of the number of output-lines of the first decoders 123-1, 123-2, and 123-3 may be different from a sum of the number of output-lines of the second decoders 127-1, 127-2, and 127-3. In this case, the number of all scan-lines SL1 through SLk of the upper display region of the display panel 110 may be different from the number of all scan-lines SLk+1 through SLn of the lower display region of the display panel 110. As described above, the number of signal-lines that are arranged in the outer region of the upper display region of the display panel 110 may correspond to a sum of the number of output-lines of the first decoders 123-1, 123-2, and 123-3, and the number of signal-lines that are arranged in the outer region of the lower display region of the display panel 110 may correspond to a sum of the number of output-lines of the second decoders 127-1, 127-2, and 127-3. In addition, a multiplication of the number of output-lines of the first decoders 123-1, 123-2, and 123-3 may correspond to the number of all scan-lines SL1 through SLk of the upper display region of the display panel 110, and a multiplication of the number of output-lines of the second decoders 127-1, 127-2, and 127-3 may correspond to the number of all scan-lines SLk+1 through SLn of the lower display region of the display panel 110. That is, since the number of all scan-lines SL1 through SLn of the display panel 110 for implementing the MD resolution is 1080, the number of signal-lines that are arranged in the outer region of the display panel 110 may be 25 (i.e., 10+9+6=25). On the other hand, in a conventional display panel in which the upper display region is not separated from the lower display region, the number of signal-lines that are arranged in the outer region of the conventional display panel for driving 1080 (i.e., 12*10*9=1080) scan-lines SL1 through SLn may be 31 (i.e., 12+10+9=31). Therefore, the scan driving unit 120 may reduce the number of signal-lines that are arranged in the outer region of the display panel 110 by including the two-stage upper decoding structure and the two-stage lower decoding structure that are coupled to the upper display region of the display panel 110 and the lower display region of the display panel 110, respectively.

Figure 10:
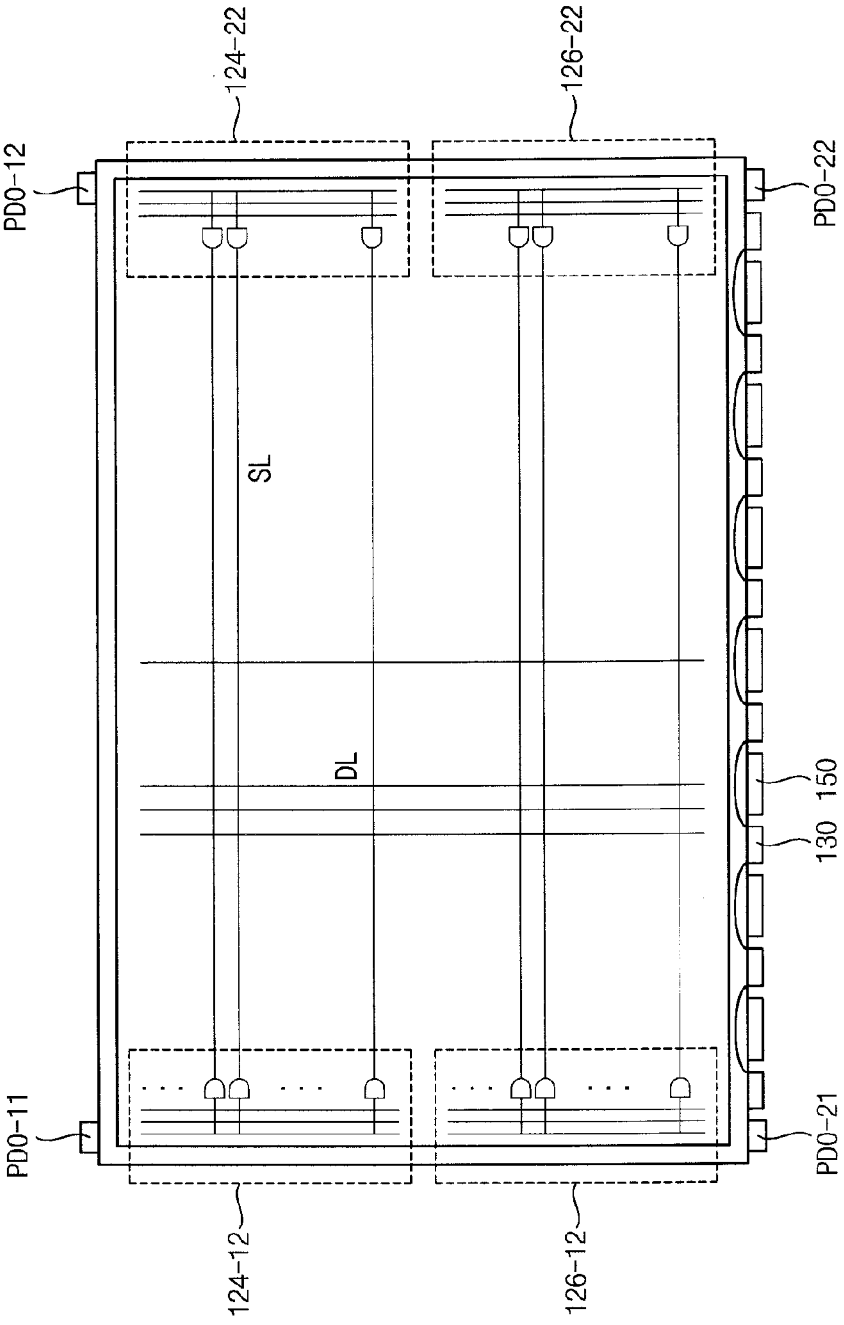
FIG. 10 is a diagram illustrating an example in which first and second final-decoder blocks of a scan driving unit of FIG. 8 are located in a display panel.

FIG. 10 is a diagram illustrating an example in which first and second final-decoder blocks of a scan driving unit of FIG. 8 are located in a display panel.

Referring to FIG. 10, it is illustrated in FIG. 10 that the first final-decoder block 124-12 and 124-22 and the second final-decoder block 126-12 and 126-22 of the scan driving unit 120 are located inside the display panel 110. As illustrated in FIG. 10, signal-lines that are extended from output terminal blocks PDQ-11 and PDQ-12 of the first pre-decoder block 122-1, where the first pre-decoder block 122-1 is located outside the display panel 110 (e.g., in an upper direction), may be arranged in both outer regions (i.e., both sides) of the display panel 110. Likewise, signal-lines that are extended from output terminal blocks PDQ-21 and PDQ-22 of the second pre-decoder block 122-2, where the second pre-decoder block 122-2 is located outside the display panel 110 (e.g., in a lower direction), may be arranged in both outer regions (i.e., both sides) of the display panel 110. The display panel 110 may receive a data signal from a data driving unit 130 (e.g., a data driving IC), and may receive a power voltage from a power unit 150 (e.g., a power supply FPC). FIG. 10 shows the display panel 110 having an FHD resolution. Here, the number of all scan-lines SL1 through SLk of the upper display region of the display panel 110 may be 540, the number of all scan-lines SLk+1 through SLn of the lower display region of the display panel 110 may be 540, and the number of all scan-lines SL1 through SLn of the display panel 110 may be 1080 (i.e., 540+540=1080). In example embodiments, the number of signal-lines that are arranged in the outer region of the display panel 110 may be 25 (i.e., 10+9+6=25). On the other hand, the number of signal-lines that are arranged in the outer region of the conventional display panel in which the upper display region is not separated from the lower display region may be 31 (i.e., 12+10+9=31). For example, assuming that a width of one signal-line is 90 um, and a width between two signal-lines is 30 um, a dead space of the display panel 110 may be 3000 um (i.e., (90 um+30 um)*25=3000 um). On the other hand, a dead space of the conventional display panel may be 3720 um (i.e., (90 um+30 um)*31=3720 um). As a result, compared to the conventional display panel, the display panel 110 may reduce a dead space by 720 um (i.e., (90 um+30 um)*6=720 um) in one outer region of the display panel 110 (i.e., by 1440 um in both outer regions of the display panel 110).

Figure 11:
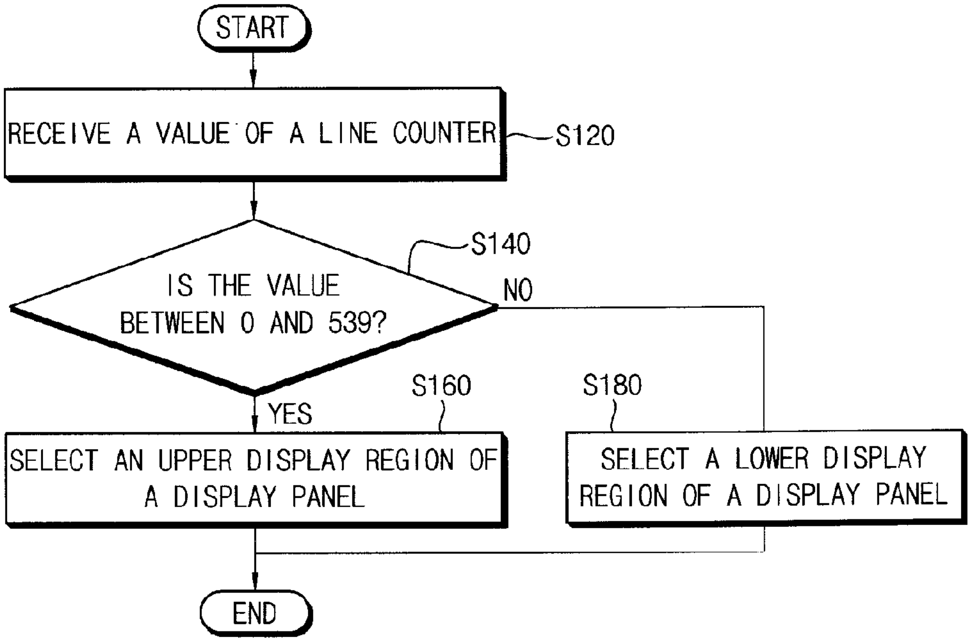
FIG. 11 is a flowchart illustrating a method of controlling a scan driving unit included in an organic light emitting display device of FIG. 1.

FIG. 11 is a flowchart illustrating a method of controlling a scan driving unit included in an organic light emitting display device of FIG. 1.

Referring to FIG. 11, it is illustrated in FIG. 10 that the scan driving unit 120 is controlled. The number of all scan-lines SL1 through SLn of the display panel 110 is 1080 (i.e., 0~1079) when an FHD resolution is implemented. For convenience of descriptions, it is assumed that the number of all scan-lines SL1 through SLk of the upper display region of the display panel 110 is 540 (i.e., 0~539), and the number of all scan-lines SLk+1 through SLn of the lower display region of the display panel 110 is 540 (i.e., 54~1079). In this case, the method of FIG. 11 may receive a value of a line counter (Step S120), and may check whether the value of the line counter is between 0 and 539 (Step S140). Then, when the value of the line counter is between 0 and 539, the method of FIG. 11 may select the upper display region of the display panel 110 (Step S160). On the other hand, when the value of the line counter is between 540 and 1079, the method of FIG. 11 may select the lower display region of the display panel 110 (Step S180). As described above, the scan driving unit 120 may reduce the number of outer signal-lines of the display panel 110 by including the two-stage upper decoding structure and the two-stage lower decoding structure that are coupled to the upper display region of the display panel 110 and the lower display region of the display panel 110, respectively. However, although the upper display region is separated from the lower display region in the display panel 110, the upper display region and the lower display region of the display panel 110 are not driven independently of each other. Therefore, when the value of the line counter indicates the upper display region of the display panel 110, the value of the line counter may be matched to the upper scan-line selection signals U1 through U11. On the other hand, when the value of the line counter indicates the lower display region of the display panel 110, a value generated by subtracting the number of the upper scan-lines SL1 through SLk from the value of the line counter may be matched to the lower scan-line selection signals L1 through L11.

Figure 12:
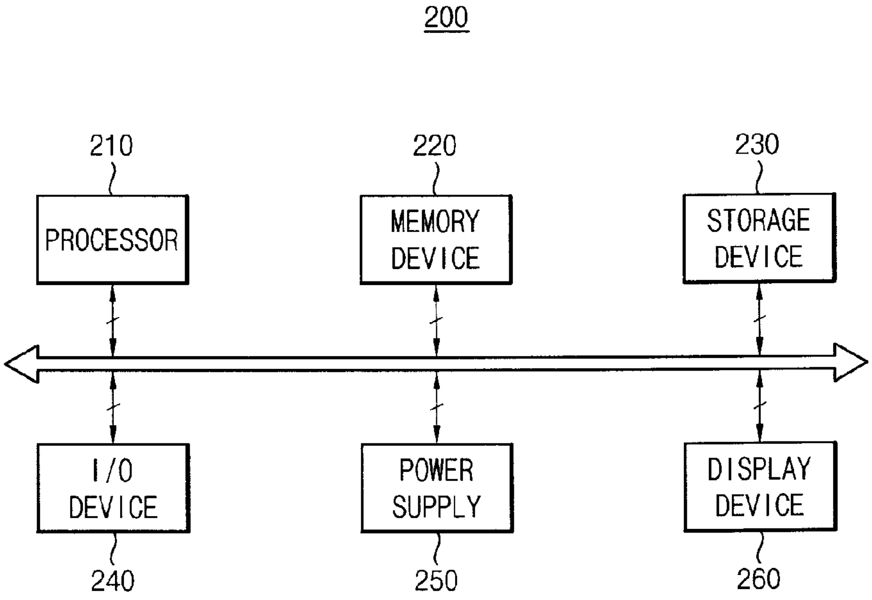
FIG. 12 is a block diagram illustrating an electronic device having an organic light emitting display device of FIG. 1.

FIG. 12 is a block diagram illustrating an electronic device having an organic light emitting display device of FIG. 1.

Referring to FIG. 12, the electronic device 200 may include a processor 210, a memory device 220, a storage device 230, an input/output (I/O) device 240, a power supply 250, and an organic light emitting display device 260. Here, the organic light emitting display device 260 may correspond to the organic light emitting display device 100 of FIG. 1. In addition, the electronic device 200 may further include a plurality of ports for communicating a video card, a sound card, a memory card, a universal serial bus (USB) device, other electronic devices, etc.

The processor 210 may perform various computing functions. The processor 210 may be a micro processor, a central processing unit (CPU), etc. The processor 210 may be coupled to other components via an address bus, a control bus, a data bus, etc. Further, the processor 210 may be coupled to an extended bus such as a peripheral component interconnection (PCI) bus. The memory device 220 may store data for operations of the electronic device 200. For example, the memory device 220 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile DRAM device, etc. The storage device 230 may be a solid state drive (SSD) device, a hard disk drive (HDD) device, a CD-ROM device, etc.

The I/O device 240 may be an input device such as a keyboard, a keypad, a mouse, etc, and an output device such as a printer, a speaker, etc. According to some example embodiments, the organic light emitting display device 260 may be included in the I/O device 240. The power supply 250 may provide a power for operations of the electronic device 200. The organic light emitting display device 260 may communicate with other components via the buses or other communication links. As described above, the organic light emitting display device 260 may include a display panel, a scan driving unit, a data driving unit, a power unit, and a timing control unit. In addition, the organic light emitting display device 260 may employ a digital driving technique. However, a driving technique of the organic light emitting display device is not limited thereto. In the organic light emitting display device 260, the scan driving unit may reduce the number of out signal-lines of the display panel by including a two-stage upper decoding structure and a two-stage lower decoding structure that are coupled to an upper display region of the display panel and a lower display region of the display panel 110, respectively. In detail, the scan driving unit may have a structure in which the upper display region of the display panel and the lower display region of the display panel are coupled to a first final-decoder block and a second final-decoder block, respectively, and the first final-decoder block and the second final-decoder block are coupled to a first pre-decoder block and a second pre-decoder block, respectively. As a result, a dead space of the display panel may be reduced.

The present inventive concept may be applied to a system having an organic light emitting display device. For example, the present inventive concept may be applied to a computer monitor, a laptop, a digital camera, a cellular phone, a smart phone, a smart pad, a television, a personal digital assistant (PDA), a portable multimedia player (PMP), a MP3 player, a navigation system, a game console, a video phone, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An organic light-emitting diode (OLED) display, comprising:

a display panel including upper and lower display regions;

a scan driver electrically connected to the display panel and comprising:

a first pre-decoder block configured to receive upper scan-line selection signals and configured to output first logic signals based on the upper scan-line selection signals;

a second pre-decoder block configured to receive lower scan-line selection signals and configured to output second logic signals based on the lower scan-line selection signals;

a first final-decoder block coupled to the left side of the upper display region and the first pre-decoder block and configured to select a first one of the upper scan-lines that are arranged in the upper display region based on the first logic signals;

a second final-decoder block coupled to the left side of the lower display region and the second pre-decoder block and configured to select a first one of the lower scan-lines that are arranged in the lower display region based on the second logic signals;

a third final-decoder block coupled to the right side of the upper display region and the first pre-decoder block and configured to select a second one of the upper scan-lines based on the first logic signals;

a fourth final-decoder block coupled to the right side of the lower display region and the second pre-decoder block and configured to select a second one of the lower scan-lines based on the second logic signals; and a single timing controller configured to control the first and second pre-decoder blocks and the first and second final-decoder blocks.

2. The display of claim 1, wherein the first and second pre-decoder blocks are located outside the display panel, and the first and second final-decoder blocks are located inside the display panel.

3. The display of claim 2, wherein the first and second pre-decoder blocks are included in the timing controller, and the first and second final-decoder blocks are included in the display panel.

4. The display of claim 1, wherein the first pre-decoder block includes:

a plurality of first decoders configured to generate the first logic signals based on the upper scan-line selection signals.

5. The display of claim 4, wherein the second pre-decoder block includes:

a plurality of second decoders configured to generate the second logic signals based on the lower scan-line selection signals.

6. The display of claim 5, wherein the number of signal-lines that are arranged in an outer region of the upper display region corresponds to the sum of the number of output-lines of the first decoders, and wherein the number of signal-lines that are arranged in an outer region of the lower display region corresponds to the sum of the number of output-lines of the second decoders.

7. The display of claim 6, wherein multiplication of the number of the output-lines of the first decoders corresponds to the number of the upper scan-lines of the display panel, and wherein multiplication of the number of the output-lines of the second decoders corresponds to the number of the lower scan-lines of the display panel.

8. The display of claim 7, wherein the sum of the number of the output-lines of the first decoders is the same as the sum of the number of the output-lines of the second decoders.

9. The display of claim 7, wherein the sum of the number of the output-lines of the first decoders is different from the sum of the number of the output-lines of the second decoders.

10. The display of claim 1, further comprising a line counter configured to count a number and output i) the upper scan-line selection signals when the number is below a predetermined value and ii) the lower scan-line signals when the number is equal to or above predetermined value, wherein the timing controller is further configured to control the pre-decoder blocks and the final-decoder blocks based on the upper and lower scan-line selection signals output from the line counter.

11. The display of claim 1, wherein the display panel comprises a plurality of pixels, wherein the second upper scan line selected by the third final-decoder block is configured to drive pixels located closer to the third final-decoder block than the first final-decoder block, and wherein the second upper scan line selected by the fourth final-decoder block is configured to drive pixels located closer to the fourth final-decoder block than the second final-decoder block.

12. An organic light-emitting diode (OLED) display, comprising:

a display panel including upper and lower display regions;

a scan driver electrically connected to the display panel and comprising:

a first pre-decoder block configured to receive upper scan-line selection signals and configured to output first logic signals and first inverted logic signals based on the upper scan-line selection signals, the first inverted logic signals being generated by inverting the first logic signals;

a second pre-decoder block configured to receive lower scan-line selection signals and configured to output second logic signals and second inverted logic signals based on the lower scan-line selection signals, the second inverted logic signals being generated by inverting the second logic signals;

a first final-decoder block coupled to the left side of the upper display region and the first pre-decoder block and configured to select a first one of the upper scan-lines that are arranged in the upper display region based on the first logic signals and the first inverted logic signals;

a second final-decoder block coupled to the left side of the lower display region and the second pre-decoder block and configured to select a first one of the lower scan-lines that are arranged in the lower display region based on the second logic signals and the second inverted logic signals;

a third final-decoder block coupled to the right side of the upper display region and the first pre-decoder block and configured to select a second one of the upper scan-lines based on the first logic signals and the first inverted logic signals;

a fourth final-decoder block coupled to the right side of the lower display region and the second pre-decoder block and configured to select a second one of the lower scan-lines based on the second logic signals and the second inverted logic signals; and a single timing controller configured to control the first and second pre-decoder blocks and the first and second final-decoder blocks.

13. The display of claim 12, wherein the first and second pre-decoder blocks are located outside the display panel, and the first and second final-decoder blocks are located inside the display panel.

14. The display of claim 13, wherein the first and second pre-decoder blocks are included in the timing controller, and the first and second final-decoder blocks are included in the display panel.

15. The display of claim 12, wherein the first pre-decoder block includes:

a plurality of first decoders configured to generate the first logic signals based on the upper scan-line selection signals; and a plurality of first inverters configured to generate the first inverted logic signals based on the first logic signals.

16. The display of claim 15, wherein the second pre-decoder block includes:

a plurality of second decoders configured to generate the second logic signals based on the lower scan-line selection signals; and a plurality of second inverters configured to generate the second inverted logic signals based on the second logic signals.

17. The display of claim 16, wherein the number of signal-lines that are arranged in an outer region of the upper display region corresponds to the sum of the number of output-lines of the first decoders, and wherein the number of signal-lines that are arranged in an outer region of the lower display region corresponds to the sum of the number of output-lines of the second decoders.

18. The display of claim 17, wherein multiplication of the number of the output-lines of the first decoders corresponds to the number of the upper scan-lines of the display panel, and wherein multiplication of the number of the output-lines of the second decoders corresponds to the number of the lower scan-lines of the display panel.

19. The display of claim 18, wherein the sum of the number of the output-lines of the first decoders is the same as the sum of the number of the output-lines of the second decoders.

20. The display of claim 18, wherein the sum of the number of the output-lines of the first decoders is different from the sum of the number of the output-lines of the second decoders.

21. An organic light emitting display device, comprising:

a display panel having an upper and lower display regions each comprising a plurality of pixel circuits;

a scan driving unit configured to provide a scan signal to the pixel circuits;

a data driving unit configured to provide a data signal to the pixel circuits;

a power unit configured to provide a high power voltage and a low power voltage to the pixel circuits; and a single timing controller configured to control the scan driving unit, the data driving unit, and the power unit, wherein the scan driving unit includes a two-stage upper decoding structure and a two-stage lower decoding structure that are respectively coupled to the upper and lower display regions, wherein the upper decoding structure includes i) a first pre-decoder and ii) a first pair of final decoders coupled to the first pre-decoder and respectively coupled to the left and right sides of the upper display region, and wherein the lower decoding structure includes i) a second pre-decoder and ii) a second pair of final decoders coupled to the second pre-decoder and respectively coupled to the left and right sides of the lower display region, and wherein the single timing controller is further configured to control the upper and lower decoding structures.

22. The device of claim 21, wherein the organic light emitting display device is configured to employ a digital driving technique that divides one frame into a plurality of sub-frames, differently sets each emission time of the sub-frames, and implements a specific gray level based on a sum of emission times of the sub-frames.

23. The device of claim 21, wherein the two-stage upper decoding structure includes:

a first pre-decoder block configured to receive upper scan-line selection signals for selecting one of upper scan-lines that are arranged in the upper display region, and configured to output first logic signals based on the upper scan-line selection signals; and a first final-decoder block coupled between the upper display region and the first pre-decoder block, and configured to select one of the upper scan-lines based on the first logic signals.

24. The device of claim 23, wherein the two-stage lower decoding structure includes:

a second pre-decoder block configured to receive lower scan-line selection signals for selecting one of lower scan-lines that are arranged in the lower display region, and configured to output second logic signals based on the lower scan-line selection signals; and a second final-decoder block coupled between the lower display region and the second pre-decoder block, and configured to select one of the lower scan-lines based on the second logic signals.

25. The device of claim 21, wherein the two-stage upper decoding structure includes:

a first pre-decoder block configured to receive upper scan-line selection signals for selecting one of upper scan-lines that are arranged in the upper display region, and configured to output first logic signals and first inverted logic signals based on the upper scan-line selection signals, the first inverted logic signals being generated by inverting the first logic signals; and a first final-decoder block coupled between the upper display region and the first pre-decoder block, and configured to select one of the upper scan-lines based on the first logic signals and the first inverted logic signals.

26. The device of claim 25, wherein the two-stage lower decoding structure includes:

a second pre-decoder block configured to receive lower scan-line selection signals for selecting one of lower scan-lines that are arranged in the lower display region, and configured to output second logic signals and second inverted logic signals based on the lower scan-line selection signals, the second inverted logic signals being generated by inverting the second logic signals; and a second final-decoder block coupled between the lower display region and the second pre-decoder block, and configured to select one of the lower scan-lines based on the second logic signals and the second inverted logic signals.

* * * * *